ALBERT T. KIRCHHEIN

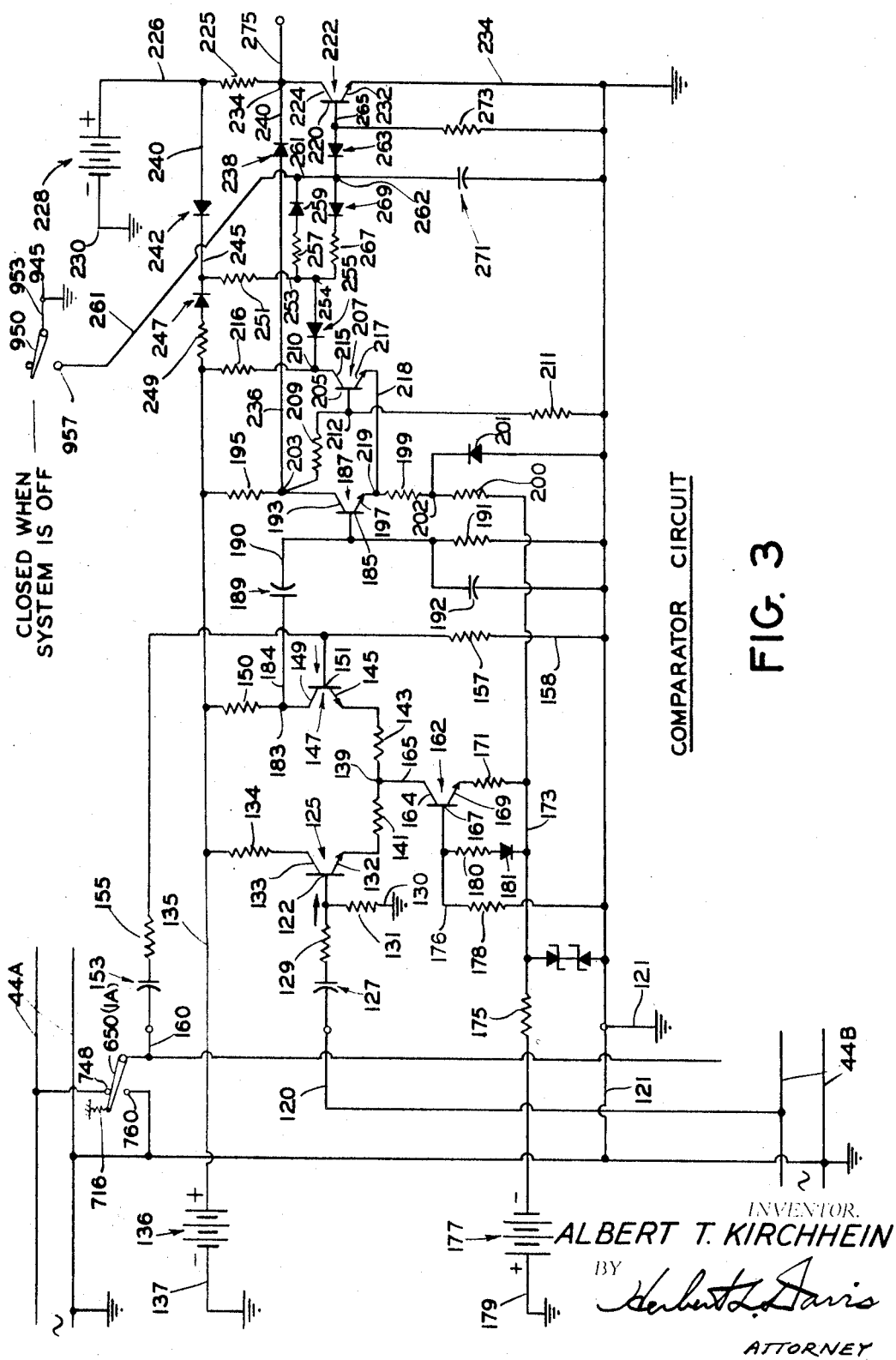

July 8, 1969     A. T. KIRCHHEIN     3,454,851

RESEQUENCING CONTROL SYSTEM AND TIMING MEANS

Filed March 31, 1965     Sheet 6 of 10

CURRENT MONITOR

LEVEL SENSOR

INVENTOR.
ALBERT T. KIRCHHEIN
BY
*Hubert L. Davis*
ATTORNEY

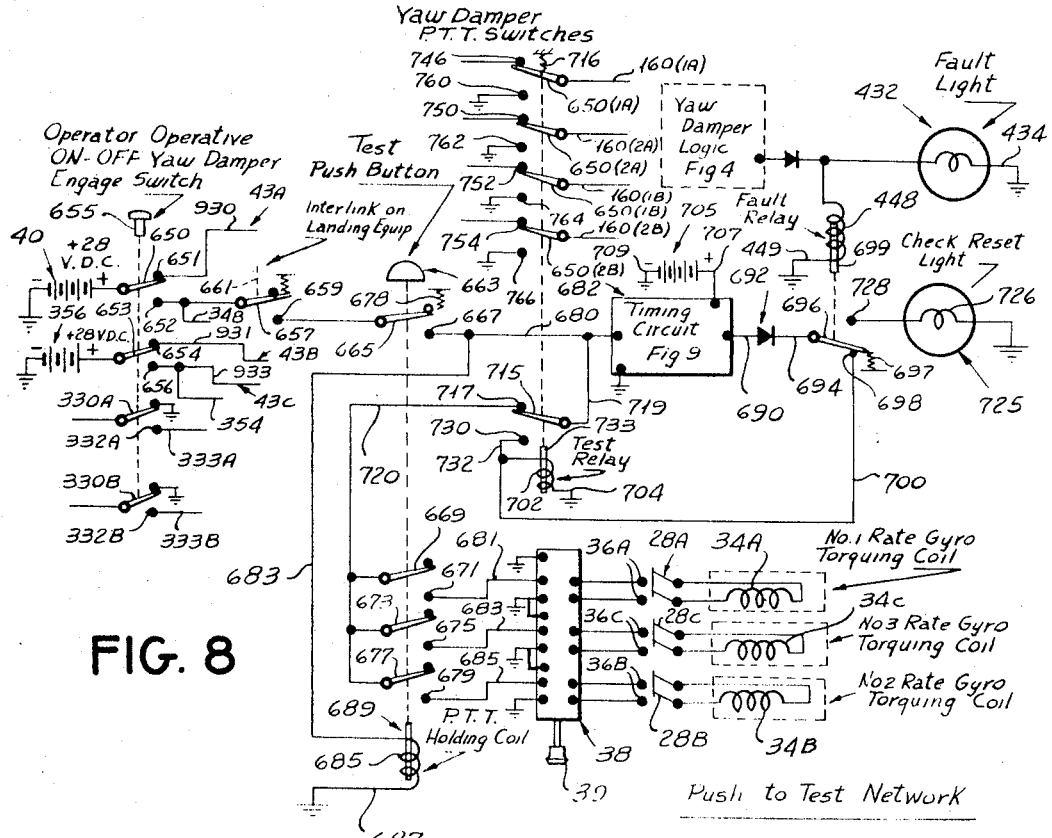

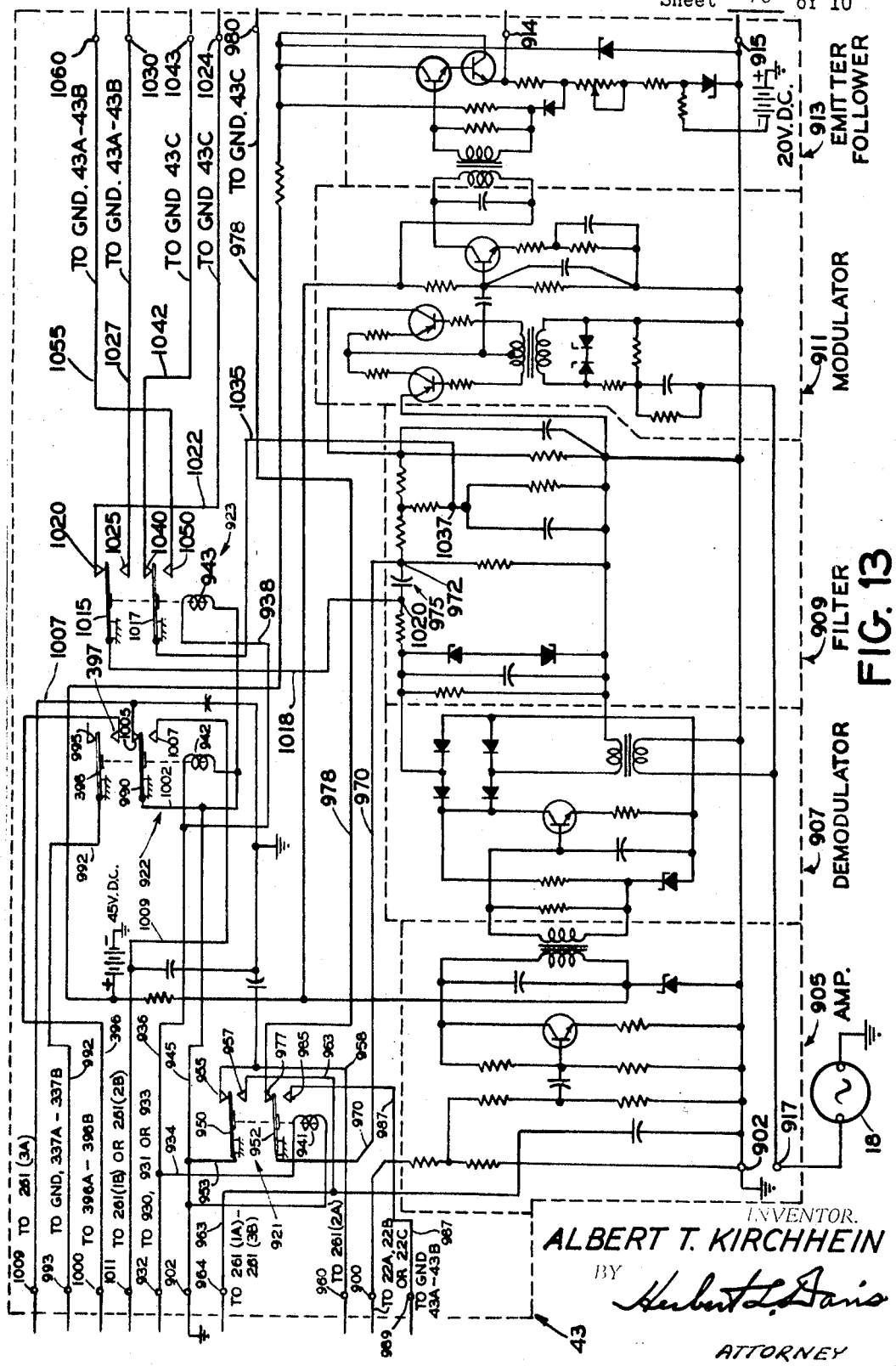

United States Patent Office 3,454,851
Patented July 8, 1969

3,454,851
RESEQUENCING CONTROL SYSTEM
AND TIMING MEANS
Albert T. Kirchhein, Clifton, N.J., assignor to The
Bendix Corporation, Teterboro, N.J., a corporation
of Delaware
Filed Mar. 31, 1965, Ser. No. 444,333
Int. Cl. G05b *11/01;* H01h *47/18;* H02p *5/00*
U.S. Cl. 318—18                                11 Claims

ABSTRACT OF THE DISCLOSURE

A resequencing control device including a timing means having a relay operated switching means in an output of the timing means for rendering the control device operative after a predetermined delay period, the relay being responsive to operation of the control device for momentarily causing the switching means to interrupt the output of the timing means to effect a cessation of operation of the timing means and thereafter cause the switching means to selectively connect the output of the timing means to a second device and effect a resequencing of operation of the timing means for rendering the second device operative after another delay period predetermined by the timing means.

This invention relates to improvements in a resequencing control system and timing means for a monitoring and testing system of a type such as described and claimed in a U.S. application Ser. No. 444,604, filed Apr. 1, 1965 by Albert T. Kirchhein and Louis J. Franchi and assigned to The Bendix Corporation. More particularly, the subject matter of the present invention relates to the provision of an improved timing means together with a control network for the timing means to automatically effect predetermined phases in the monitoring and self-testing of a dynamic command loop and fail operative logic circuitry for a dual yaw damper control system of a type such as described and claimed in U.S. application Ser. No. 414,- 564, filed Nov. 30, 1964, by Louis J. Franchi, Ralph Sellite and James E. Bulloch, now U.S. Patent No. 3,379,951, granted Apr. 23, 1968, including a hydraulic power control rudder actuator together with a preload override spring device to operably connect each of the dual servo control systems to the hydraulic control of a type such as described and claimed in U.S. application Ser. No. 414,- 086, filed Nov. 27, 1964, by Oscal R. Wermlinger, now U.S. Patent No. 3,282,069, granted Nov. 1, 1966, both of which patents have been assigned to The Bendix Corporation.

An object of the invention is to provide a novel resequencing control system and timing means for a device to monitor and test an aircraft control and which resequencing control system includes a relay operated switch in the output of the timer having the double function of resequencing the operation of the timer upon completion of a first phase of operation of the monitor and testing means by interrupting the output of the timer while selectively connecting the output of the timer in one sense to complete an energizing circuit for a test relay and in an alternate sense to complete a second energizing circuit for a lamp to indicate the completion of a second phase of operation of the monitoring and testing means or a fault in the aircraft control under test.

Another object of the invention is to provide in an automatic testing means a novel sequential timer to provide first and second phases for testing operational performance of an aircraft control system.

Another object of the invention is to provide a novel electronic timer including means such that upon electrical power applied at an input to the timer or at an output from the timer being interrupted, the timer may be automatically reset to begin another timing cycle upon the interrupted input or output being again completed.

Another object of the invention is to provide in combination with such an electronic timer a novel resequencing control system to operate the timer and including a resequencing relay having a switch element to momentarily interrupt the output of the timer for an interval of time of greater duration than the time required for resequencing the electronic timer.

Another object of the invention is to provide in such a resequencing control system a control relay energized by the output of the timer for effecting a control function in a device operated thereby to in turn effect through a controlled network an energization of the resequencing relay to actuate the switch element thereof to momentarily interrupt the output of the timer.

These and other objects and features of the invention are pointed out in the following description in terms of the embodiment thereof which is shown in the accompanying drawings. It is to be understood, however, that the drawings are for the purpose of illustration only and are not a definition of the limits of the invention. Reference is to be had to the appended claims for this purpose.

In the drawings in which corresponding numerals indicate corresponding parts:

FIGURE 3 is a schematic wiring diagram of the comparator embodied in the systems of FIGURES 1, 2 and 2A.

Figure 2:
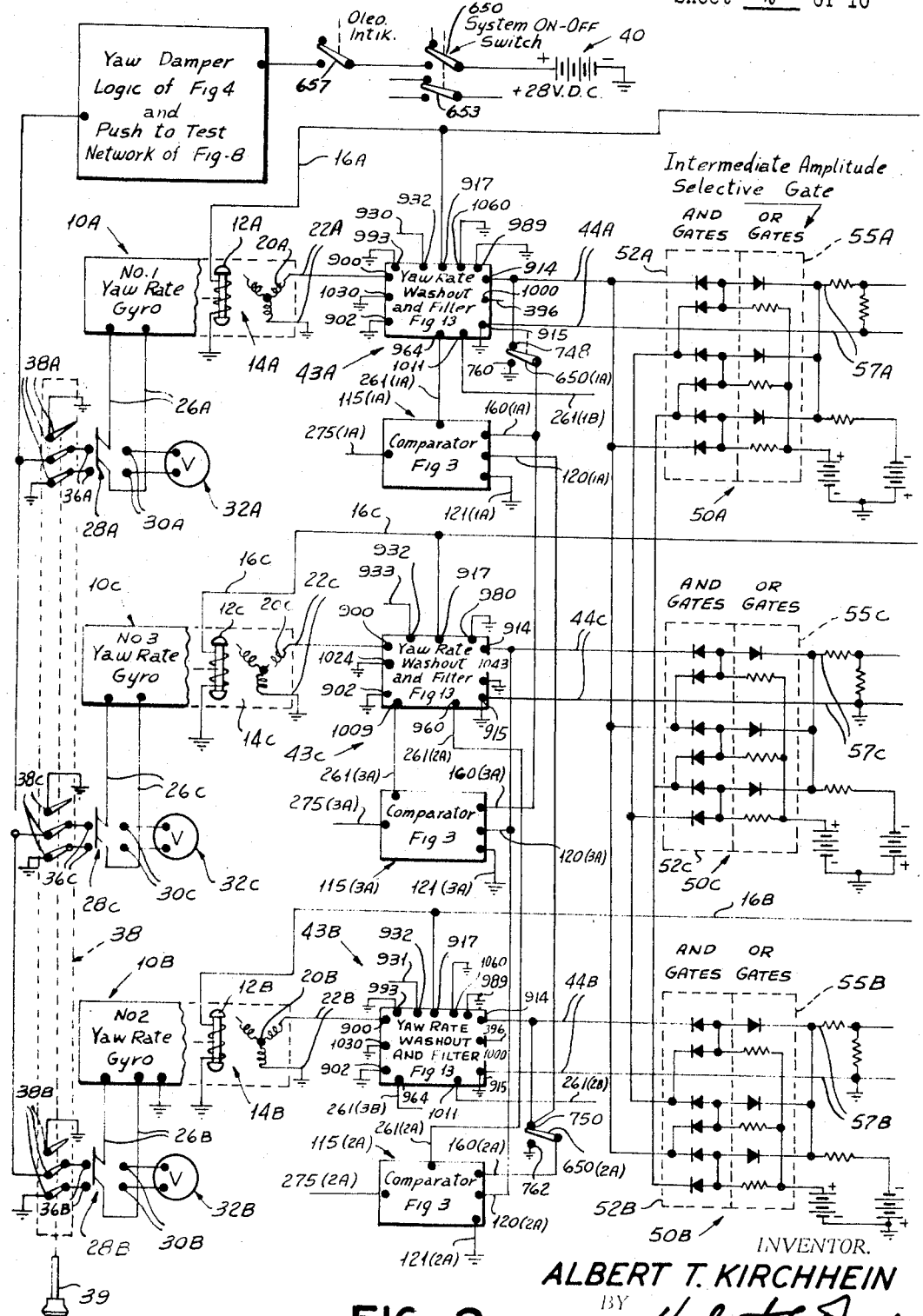
FIGURE 2 is a schematic wiring diagram of the rate gyro signal portion of the system of FIGURE 1.
Figure 2A:
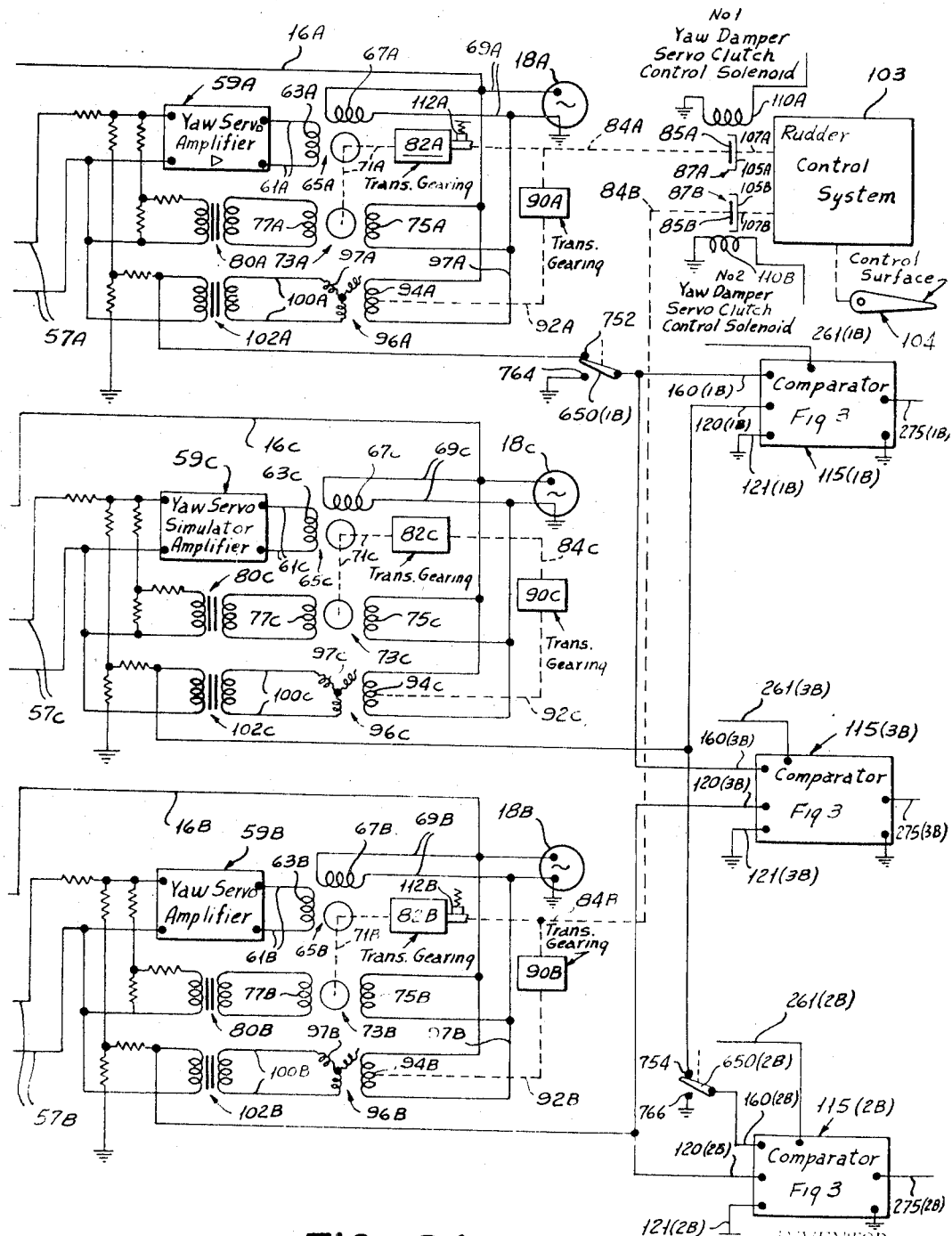
FIGURE 2A is a schematic wiring diagram of the servo motor portion of the system of FIGURE 1.
Figure 4:
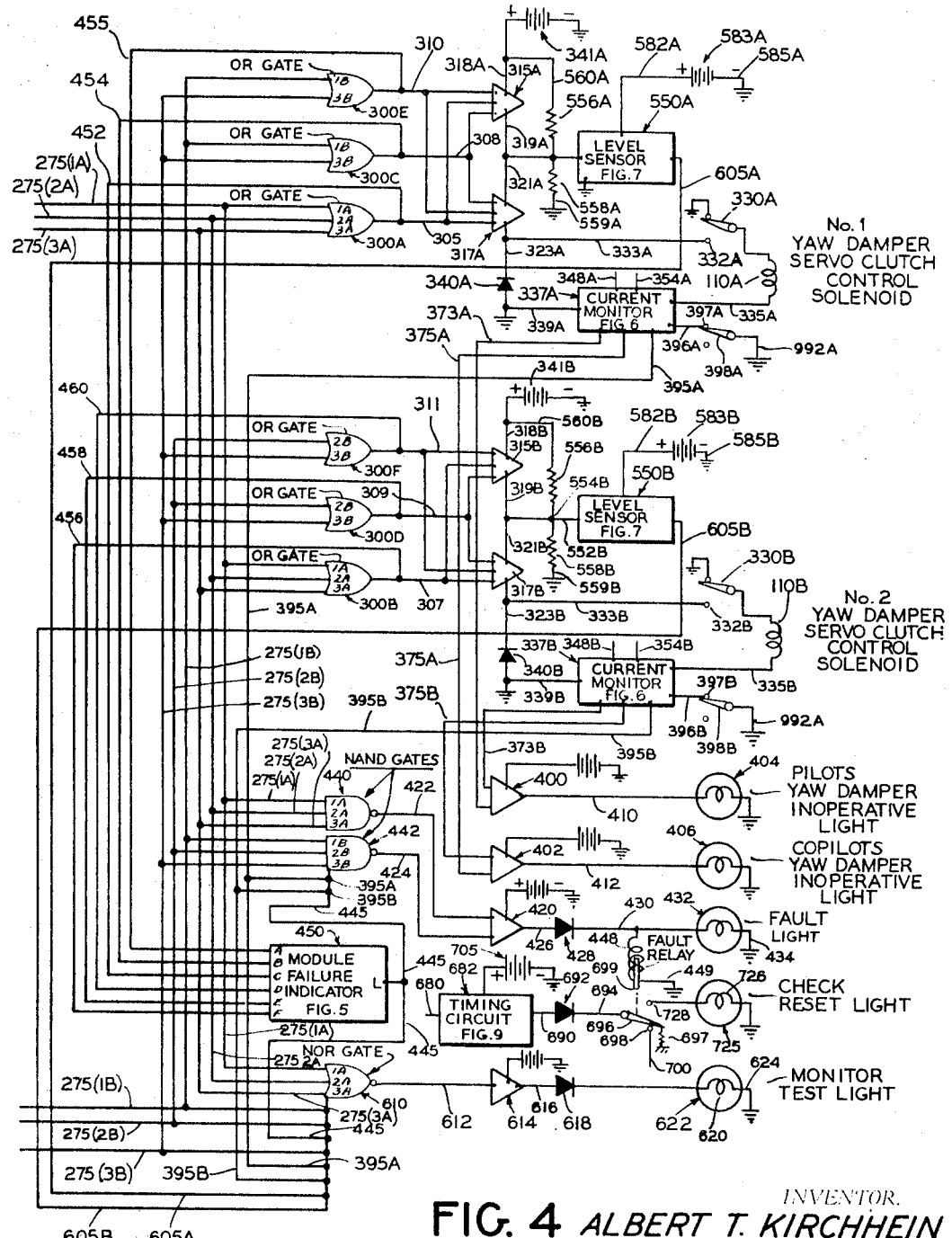
FIGURE 4 is a schematic block wiring diagram showing the yaw damper logic network operative by the comparators shown in the systems of FIGURES 1, 2 and 2A and in detail in FIGURE 3 and a portion of the resequencing control system and timing means of the present invention.

FIGURE 8 is a schematic wiring diagram of the push-to-test network showing a portion of the timing means and resequencing control system therefor including the test relay in operative relation to the comparator control switches of FIGURES 2 and 2A and the fault relay, fault light, check reset light and timing circuit of FIGURES 4 and 9 embodied in the present invention and illustrated in an operative relation in the circuitry of the push-to-test network.

FIGURE 9 is a schematic wiring diagram of the timing circuit of the present invention embodied in the push-to-test network of FIGURE 8.

Figure 10:
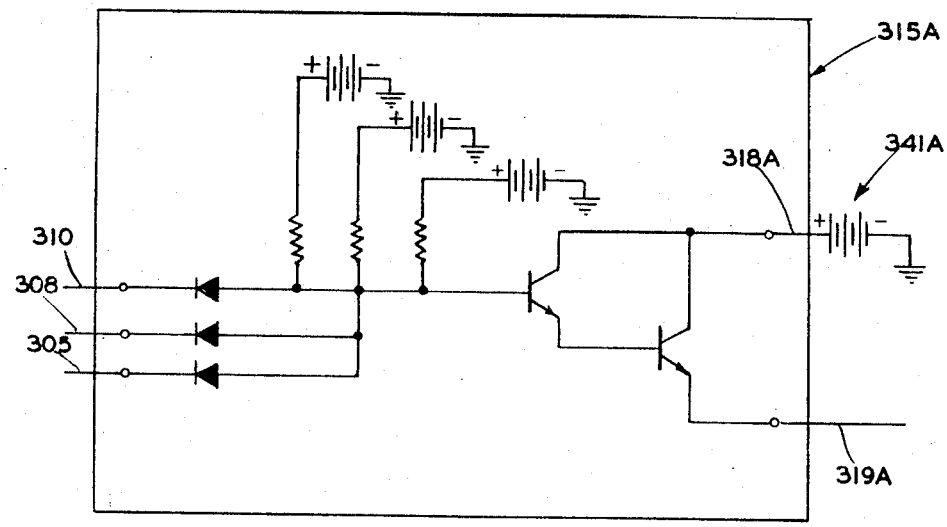

FIGURE 10 is a schematic wiring diagram of a control circuit that may be embodied in the driver units 315A, 317A, 315B, 317B, 400, 402 and 614 of the yaw damper logic network of FIGURE 4.

Figure 11:
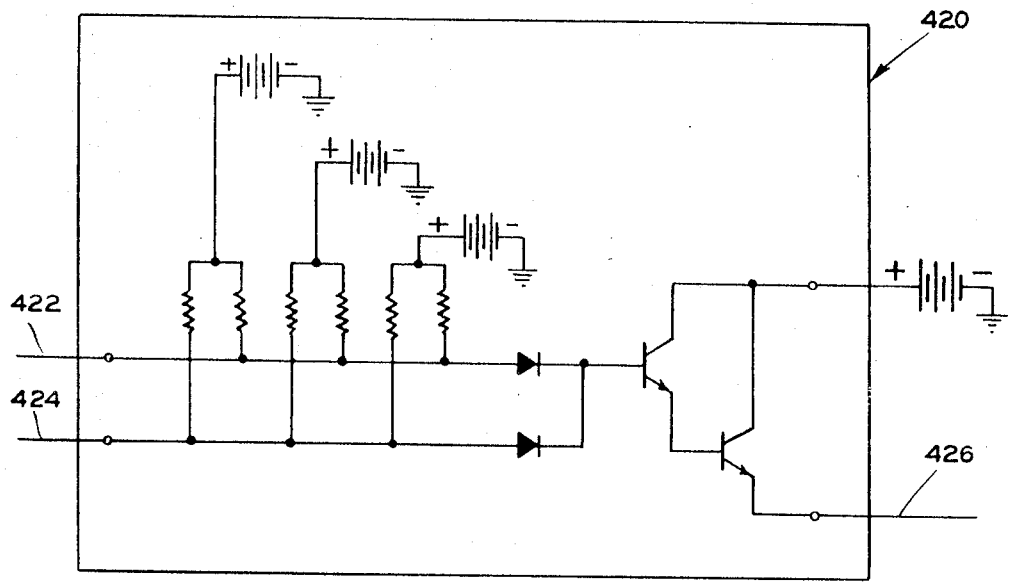

FIGURE 11 is a schematic wiring diagram of a control circuit that may be embodied in the driver unit 420 of the network of FIGURE 4.

Figure 12:
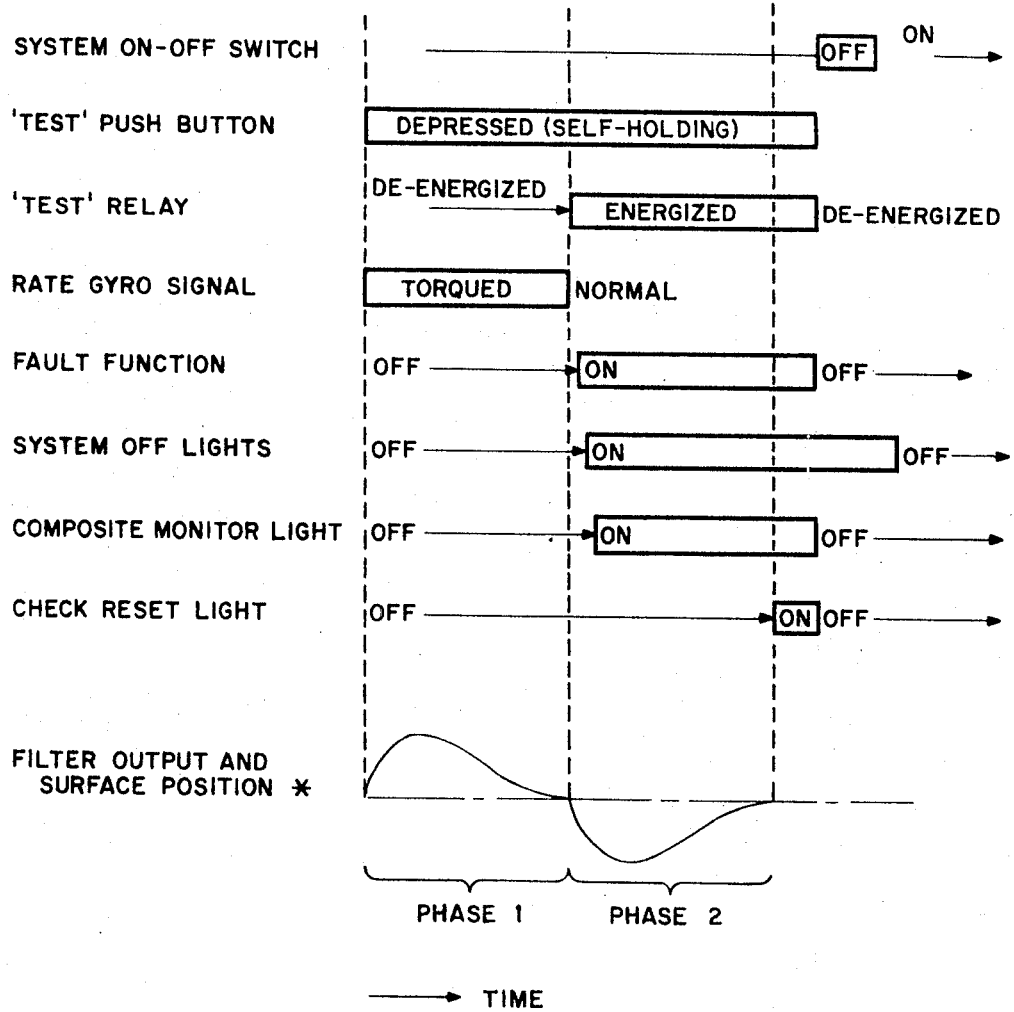

FIGURE 12 is a graphical illustration of the sequence of operation of the push-to-test network of FIGURE 8.

Figure 1:
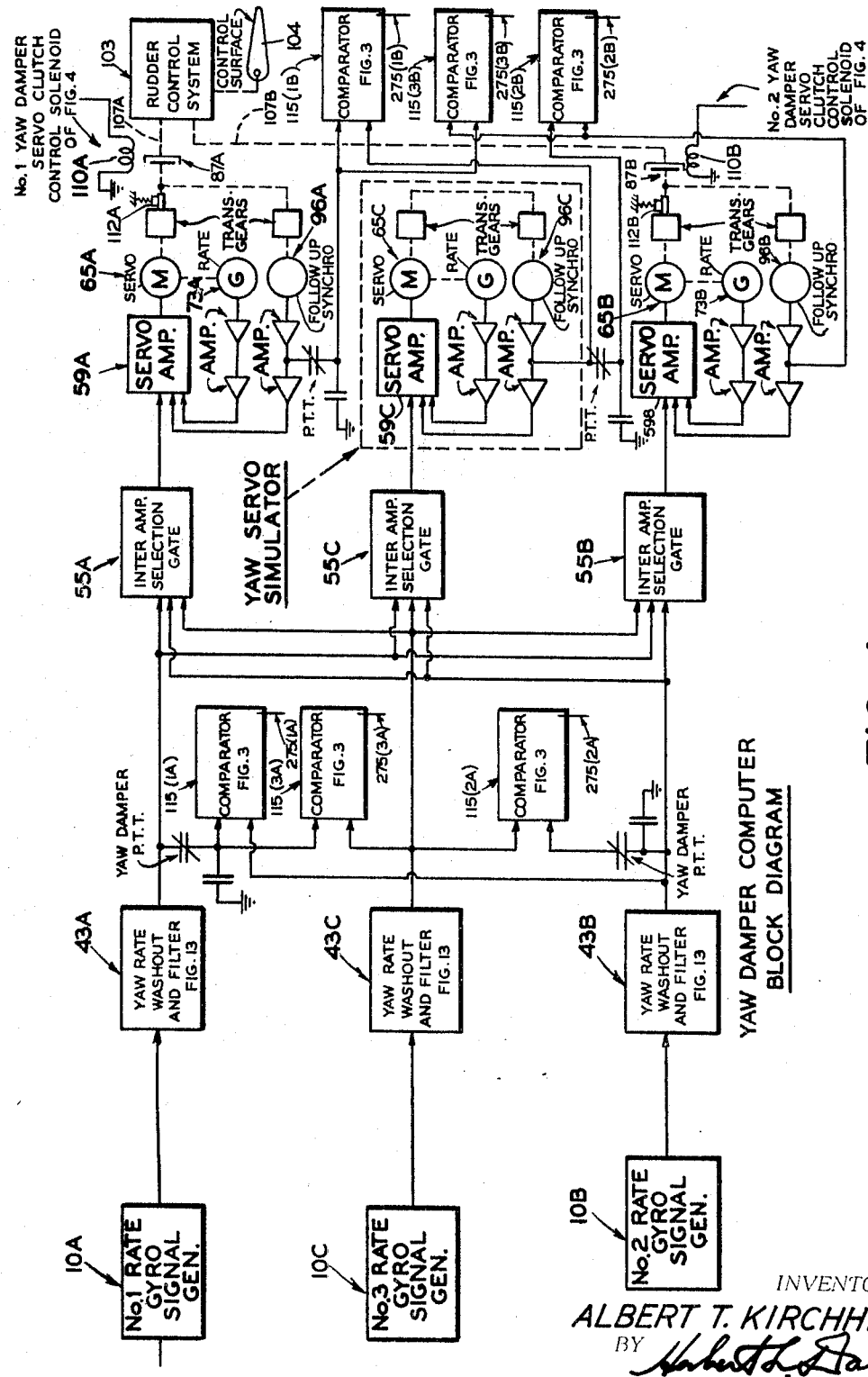
FIGURE 1 is a schematic block diagram of a fail operative control system embodying the monitoring and testing system to which the resequencing control system and timing means of the present invention may be applied.

FIGURE 13 is a schematic wiring diagram of a network that may be embodied in the yaw rate washout and filter 43A, 43B and 43C of the system of FIGURES 1 and 2.

Referring now to the drawings of FIGURES 1, 2 and 2A, there is indicated a triplicated servo system in which the corresponding elements of each servo mechanism system have been indicated by like numerals to which there have been applied the suffix A, B and C to distinguish between the respective elements of the first and second operating servo mechanism system A and B and the third model servo system C.

In the triplicated servo system, there are provided three sensors such as single axis rate gyroscopes 10A, 10B and 10C arranged, as shown in FIGURE 2, to operatively position rotor windings 12A, 12B and 12C, respectively, of synchros 14A, 14B and 14C. The rotor windings 12A, 12B and 12C are energized through electrical conductors 16A, 16B and 16C from suitable sources of constant frequency alternating current 18A, 18B and 18C. The rotor windings 12A, 12B and 12C are inductively coupled to stator windings 20A, 20B and 20C, respectively, of the synchros 14A, 14B and 14C so as to apply through output conductors 22A, 22B and 22C alternating current signals to inputs of suitable type amplifiers in the yaw rate washout and filter units 43A, 43B and 43C, shown by FIGURE 13, as hereinafter explained, and which signals correspond to the angular position of the single axis rate gyroscopes 10A, 10B and 10C, respectively.

The gyroscopes 10A, 10B and 10C may be of a type such as disclosed and claimed in a copending U.S. application Ser. No. 327,268, filed Dec. 2, 1963, by Alex Morsewich, now U.S. Patent No. 3,240,050 granted Mar. 15, 1966, and assigned to The Bendix Corporation. The single axis rate gyroscopes 10A, 10B and 10C may be small rate sensing gyroscopes measuring angular velocity of the aircraft yaw axis in which suitable motors for driving the gyro rotors, not shown, and the signal pick-off synchros 14A, 14B and 14C are powered by suitable alternating current supplied through conductors 16A, 16B and 16C from proper yaw damper power supplies 18A, 18B and 18C.

As described in the U.S. Patent No. 3,240,050, there are embedded in the rotor of each gyroscope 10A, 10B and 10C small permanent magnets and adjacent to the rotor is a winding in which an alternating current voltage proportional to rotor speed is induced when the gyro is running. This voltage may be applied through output conductors 26A, 26B and 26C and selectively connected, as shown in FIGURE 2, by operator-operative switches 28A, 28B and 28C being positioned to close contacts 30A, 30B and 30C to suitable indicator means or voltmeters 32A, 32B or 32C to verify the speed of operation of the gyro rotor.

These windings, indicated schematically in FIGURE 8 by the numerals 34A, 34B and 34C, respectively, may be alternately connected by the operator-operative switches 28A, 28B and 28C being positioned to close contacts 36A, 36B and 36C and thereby connect the windings 34A, 34B and 34C, respectively, through a switch mechanism 38, including switch elements 38A, 38B and 38C operative by a manual control member 39, as shown schematically in FIGURE 2, and the push-to-test network of FIGURE 8, to selectively connect to opposite terminals of the windings 34A, 34B and 34C the positive and negative terminals of a source of direct current or battery 40. Such selective energization of the windings 34A, 34B and 34C serves to torque the gyroscopes 10A, 10B and 10C in opposite senses, as shown and described in the U.S. Patent No. 3,240,050, and effect the test of the output of the gyroscopes, as hereinafter explained.

Further, as shown and described in the U.S. Patent No. 3,240,050, the rate gyroscopes 10A, 10B and 10C each includes a magnetic damper cooperating with the gyroscope and rotor element of the signal pick-off synchros 14A, 14B and 14C to prevent overshoot or excessive signal output as a result of vibration.

Thus, by applying a direct current from a source 40, as shown in FIGURE 2, to the respective torquing windings 34A, 34B and 34C of FIGURE 8, a magnetic field results to apply force to the permanent magnets in the rotor of the gyroscopes 10A, 10B and 10C, causing the rotor to deflect in the same manner that it would when subjected to a yaw rate. The alternating current electrical yaw rate output signal applied by the synchros 14A, 14B and 14C may then be sensed so as to assure proper operation of the gyroscopes 10A, 10B and 10C and the signal pick-off synchros 14A, 14B and 14C.

Each of the yaw rate signals from the synchros 14A, 14B and 14C is applied through the conductors 22A, 22B and 22C, respectively, to the input of the amplifiers in the filter and washout units 43A, 43B and 43C, respectively. The filter and washout units 43A, 43B and 43C, as shown in FIGURE 13, include a discriminator circuit which converts the alternating current input signals to direct current signals that can be properly shaped by the filter and a modulator to change the shaped direct current back to an alternating current output signal applied across filter output conductors 44A, 44B and 44C, respectively.

As hereinafter explained, the washout and filter units 43A, 43B and 43C take advantage of changes in frequency of the Dutch roll characteristics of the aircraft to adjust the yaw damper gain (degrees of rudder commanded per degrees of yaw rate) as required. A higher gain is required when the dutch roll frequency is relatively low (approximately 0.1 cycle per second) as it is for lower air speed conditions, particularly approach and take-off. Less yaw damper gain is required at the higher frequencies of Dutch roll (approximately 0.2 cycle per second) that are encountered in normal cruise and high speed flight. The filter is relatively complex in order to supply the proper gain for the range of Dutch roll frequencies occurring and is described and explained in greater detail hereinafter.

The filter effectively removes higher frequency signals (5 cycles per second and higher) which might cause undesirable coupling with body bending modes of the aircraft. The washout feature of the circuitry allows the system to synchronize to a constant yaw rate, as during a turn. This is accomplished by implementing the filter so that it has zero gain for steady state signals.

The outputs 44A, 44B and 44C of all three filter circuits 43A, 43B and 43C, respectively, are connected to the inputs of three intermediate amplitude selective gates 50A, 50B and 50C, each of which may be of a conventional type or of a type such as disclosed and claimed in a copending U.S. application Ser. No. 314,397, filed Oct. 7, 1963, by Harold Moreines, now U.S. Patent No. 3,305,735, granted Feb. 21, 1967, and in a copending U.S. application Ser. No. 317,970, filed Oct. 22, 1963, by Harold Moreines, and which patent and copending application have been assigned to The Bendix Corporation, assignee of the present invention.

The input network of gates 52A, 52B and 52C of the intermediate amplitude selective gates 50A, 50B and 50C each includes three "AND" type circuits. Each "AND" circuit has two inputs which are connected to outputs of the filter circuits 43A, 43B and 43C, as shown by FIGURE 2 and explained in the foregoing U.S. Patent No. 3,305,735 and U.S. application Ser. No. 317,970.

The "AND" gate function is to select the lower value signal of the two on an instantaneous basis, for example, a sine wave of one volt peak-to-peak as compared to a sine wave of two volt peak-to-peak has different relative values as to which is most negative of any given time. During the time when the signals are above the referenced center line, the lower peak amplitude signal is more negative than the higher value signal, but when the signals are below the referenced center line, the higher peak-to-peak signal is more negative.

The output network of gates 55A, 55B and 55C of the intermediate amplitude selective gate is by the nature of the diode array an "OR" gate. The "OR" gate function is just the opposite to that of the "AND" gate. The function of the "OR" gate is to select the higher value signal on an instantaneous basis. Therefore, referring to the referenced FIGURE 2, it may be seen that the intermediate amplitude selective gate selects the intermediate value signal from a three fan-in array.

For any three input signals, the output of all three gates will be the intermediate signal and essentially equal, as heretofore explained in the U.S. Patent No. 3,305,735 copending U.S. application Ser. No. 317,970.

As shown in FIGURES 2 and 2A, two of the signal chains terminate in output conductors 55A and 55B, respectively, leading from the intermediate amplitude selective gates 50A and 50B to respective servo amplifiers 59A and 59B. These amplifiers consist of stages of direct coupled transistor amplification, with quadrature rejection circuitry between stages and a high power push-pull output stage connected through conductors 61A and 61B to control windings 63A and 63B, respectively, of conventional type two-phase servo motors 65A and 65B having fixed phase windings 67A and 67B connected through conductors 69A and 69B to the sources of constant frequency alternating current 18A and 18B, respectively.

Directly coupled to the output shafts 71A and 71B of the servo motors 65A and 65B are rate generators 73A and 73B of conventional type. The rate generators 73A and 73B have windings 75A and 75B, respectively, excited by an alternating current from the appropriate yaw damper power supplies 18A and 18B. The generators 73A and 73B have output windings 77A and 77B providing an alternating current signal proportional to motor speed, and of a phase (0° or 180°) indicative of direction of rotation of the motors 65A and 65B. The generator output is added to (actually subtracted) the yaw damper signals at the inputs 57A and 57B to the servo amplifiers 59A and 59B and applied through isolation transformers 80A and 80B. The generator signals provide suitable speed control and damping of the servo motors 65A and 65B.

Each of the motors 65A and 65B have the output shafts 71A and 71B thereof drivingly connected through transmission gearings 82A and 82B to shafts 84A and 84B leading to plates 85A and 85B of output clutches 87A and 87B, respectively. The shafts 84A and 84B are further drivingly connected through transmission gearings 90A and 90B to shafts 92A and 92B drivingly connected to rotor windings 94A and 94B of follow-up synchros 96A and 96B. The follow-up synchro rotor windings 94A and 94B are supplied with an alternating current through conductors 97A and 97B leading from the appropriate yaw damper power supplies 18A and 18B.

An alternating current signal induced in stator windings 98A and 98B is applied to output conductors 100A and 100B and added (again actually subtracted) to the yaw damper signal through isolation transformers 102A and 102B at the input to the servo amplifiers 59A and 59B, respectively. Thus, synchros 96A and 96B supply a position follow-up signal for the yaw damper and, when the servo motors 65A and 65B are engaged in a driving control relation with a hydraulic rudder control system 103 through the clutches 87A and 87B, a follow-up signal applied by the synchros 96A and 96B acts with the yaw damper signal to control the position of a rudder 104 through the operation of a hydraulic rudder control system 103 which may be of a type such as described and claimed in the U.S. Patent No. 3,282,069.

Thus, the yaw damper signal of a given magnitude may cause rotation of the servo motors 65A and 65B until the output from the follow-up synchros 96A and 96B seen at the input of the servo amplifiers 59A and 59B is equal and opposite to the yaw damper signal, at which time the net servo amplifier input will be zero and the servo motors 65A and 65B will stop driving.

Removing the yaw damper input signal at the servo amplifiers 59A and 59B will result in the output signal from the follow-up synchros 96A and 96B being the net input signal to the respective servo amplifiers 59A and 59B, whereupon the servo motors 65A and 65B will be driven in a sense to adjust the rotor windings 94A and 94B to null the output of the synchos. The follow-up synchros 96A and 96B also act as a pre-engaged synchronizer since any noise or nulls in the system will cause the servo motors 65A and 65B to rotate until the rotor windings 94A and 94B of the follow-up synchros 96A and 96B are driven to a position at which the outputs of the synchros cancel the input signals to the servo amplifiers 59A and 59B, causing rotation of the servo motors 65A and 65B to cease.

The clutches 87A and 87B in the yaw damper servos are electromagnetic clutches including clutch plates 85A and 85B driven by the shafts 84A and 84B and clutch plates 105A and 105B drivingly connected to the operative control shafts 107A and 107B of the rudder control system 103. The clutch plates 85A and 105A and the clutch plates 85B and 105B are spring loaded to the disengaged condition by suitable diaphragm type springs, not shown, and the respective clutch plates may be biased into engaging relation upon energization of servo control solenoids 110A and 110B of the respective clutches 87A and 87B. The energization of the yaw damper servo clutch control solenoids 110A and 110B are controlled by suitable solid state switching, as shown in FIGURE 4. The clutch faces of the respective plates 85A and 105A and 85B and 105B are toothed to prevent any slippage when engaged.

The control shafts 107A and 107B are each operably connected in the hydraulic rudder control system by a preloaded override spring device, not shown, and which may be of a type described and claimed in the U.S. Patent No. 3,282,069.

Also, as shown diagrammatically in FIGURE 2A and explained in the U.S. Patent No. 3,379,951, the shafts 84A and 84B driven by the servo gear trains 82A and 82B, respectively, include calibrated friction brakes 112A and 112B, assuring that a nominal torque is required to rotate the servo. This braking means 112A and 112B cooperates in the detection of passive servo malfunctions, as heretofore explained in the aforenoted U.S. Patent No. 3,379,951.

Furthermore, as shown in FIGURES 2 and 2A, a third signal chain from the output conductors 57C leading from the intermediate amplitude selective gate 50C leads to a servo simulator which is, in effect, an electromechanical module whose output has the same nonlinear dynamic characteristics and gain as the servo follow-up signals and in which corresponding parts to those heretofore described with reference to the previously described first two signal chains have been indicated by corresponding numerals to which there has been affixed corresponding numerals bearing the suffix C.

As hereinafter explained, the output of the servo simulator C is used only for comparison and fault indentification.

COMPARATORS

As shown in FIGURES 2 and 2A, six comparators of identical structure, shown schematically by circuit diagram in FIGURE 3, are provided in this system. Three of the comparators indicated by the numerals 115(1A), 115(2A) and 115(3A) cross compare the outputs from the gyro filters 43A, 43B and 43C, while three other output comparators 115 (1B), 115(2B) and 115(3B) cross compare the servo follow-up signals at the output of the synchros 96A, 96B and 96C. Any disagreement between compared signals results in an alarm being effected by a comparator as hereinafter explained. The comparators may be of identical structure, as shown by the wiring diagram of FIGURE 3, and the circuit for the yaw rate washout and filters 43A, 43B and 43C may be of the structure shown in FIGURE 13, operatively connected with the several comparators 115, as hereinafter explained.

YAW DAMPER SERVO OPERATION

The yaw damper servo operating shafts 107A and 107B are connected through the preload spring devices in series with the pilot's inputs, as explained in the aforenoted U.S. Patent No. 3,379,951, and, therefore, do not move the rudder pedals. The servo mounts are an integral part of the rudder hydraulic power package 103, a mechanical schematic of which is shown in U.S. Patent No. 3,379,951. As explained therein, the rudder hydraulic power package 103 is completely dual, with each dual portion being operable by a yaw damper servo, and the arrangement is such that in actual operation the yaw damper servo operated shafts 107A and 107B may be adjusted so as to reduce the amount of rudder activity required of the pilot so that he may superimpose manual commands on the yaw damper movements at any time, in which case the rudder position may be a sum (or difference) of pilot commands and yaw damper commands.

The normal mode of operation of the yaw damper servos is with both servos 65A and 65B engaged through the clutches 87A and 87B in operative relation with the hydraulic rudder control system 103 and at which time the preload of both of the preload spring devices, described and claimed in the aforementioned U.S. Patent No. 3,282,069, allows torque transmission to operate the system. In the event of a failure of one servo, disengagement of the failed servo will be effected by means of the system logic, shown schematically in FIGURE 4 and hereinafter explained. When the failed servo is disengaged, the friction brake in it is also removed from the system. The torque required to command the rudder position is then less, and there is assured the continued operation by the other yaw damper servo of the hydraulic control system and rudder with no degradation of performance.

DETAILED COMPARATOR OPERATION

The three gyro filter comparators 115(1A), 115(2A) and 115(3A) and the three follow-up synchro output comparators 115(1B), 115(2B) and 115(3B), each of which may be of a type such as shown in FIGURE 3, are arranged to sense a predetermined voltage difference and provide an output which is a logical 1 or 0, depending upon the difference of the signal inputs. Once any comparator is alarmed, it is locked in the alarm mode until manually reset.

A schematic wiring diagram of the comparator circuit is shown in FIGURE 3 in which an alternating current signal at the output conductors 44B from the filter 43B and applied at a conductor 120 will be coupled to a base 122 of an NPN type transistor 125 through a capacitor 127 and the divided resistors 129 and 131, with the resistor 131 being connected to a common ground through a conductor 130. The transistor 125 has an emitter 132 and a collector 133. The collector 133 is connected through a resistor 134 and a conductor 135 to a positive terminal of a source of direct current or battery 136 having a negative terminal connected to ground by a conductor 137.

The arrangement is such that the current conducted by the transistor 125 will vary in direct proportion to the input signal applied across the input conductor 120 and a grounded input conductor 121. This will cause a voltage at the output of the emitter 132 to increase as the input signal increases. The output is then at a point 139 intermediate a pair of resistors 141 and 143 connecting the emitter 132 of the transistor 125 to an emitter 145 of a second NPN type transistor 147 having a collector 149 connected through a resistor 150 to the conductor 135 and thereby to the positive terminal of the battery 136. A base 151 of the transistor 147 is coupled through a capacitor 153 and the divided resistors 155 and 157 to a second input line 160 and the grounded input line 121 which is connected to the resistor 157 through a conductor 158.

A pair of output conductors 44A from a second filter 43A applies an alternating current signal across the grounded input conductor 121 and the input conductor 160. Similarly, the current conducted by the transistor 147 will vary in direct proportion to the input signal applied across input conductor 160 and the grounded conductor 121, provided the input signal applied through the conductor 120 to the transistor 125 does not vary. An increase then in the input signal to the transistor 147 will cause the voltage at the output of the emitter 145 of the transistor 147 and taken at point 139 to increase as the input signal voltage applied across the input conductor 160 and grounded conductor 121 is increased.

However, in the aforenoted arrangement it will be seen that as the current conducted by transistor 125 increases, the current conducted by an NPN type transistor 162 also increases. The transistor 162 has a collector 164 connected by a conductor 165 to the point 139, a base 167 and an emitter 169 connected through a resistor 171 to a conductor 173 leading through a resistor 175 to the negative terminal of a source of direct current or battery 177 having a positive terminal connected to ground by a conductor 179. The base 167 of the transistor 162 is connected through a conductor 176 and the resistor 178 to the grounded conductor 121 and thereby to the grounded positive terminal of the battery 177 through the grounded conductor 179.

An increase then in the current conducted by transistor 162 causes an increase in the voltage drop across the resistor 171, and a consequent decrease in the voltage drop across the base 167 and emitter 169 of transistor 162 which is effected through a resistor 180 serially connecting the base 167 to an anode of a diode 181 having a cathode element connected to the conductor 173 leading from the resistor 171 and emitter 169 of the transistor 162. This consequent decrease in the voltage drop in the base to emitter voltage of transistor 162 with the increase in the current conducted by the transistor 162 may be likened to an increase in the impedance from point 139 to the conductor 173 which would in turn result in a change in the effective voltage at point 139. The voltage changes at point 139 effect a corresponding change in the base 151 to emitter 145 relationship of the transistor 147 (under a no signal change at input line 160) and, therefore, a change in the voltage at a point 183 between resistor 150 and collector 149 and applied through an output conductor 184.

The voltage variations at point 183 resulting from the effects of the alternating current input signals are coupled to the base 185 of an NPN type transistor 187 through conductor 184, a capacitor 189 and a conductor 190. The base 185 is connected to conductor 190 and thereby to a resistor 191 and through the resistor 191 to the grounded conductor 121.

If equal alternating current signals are applied through input conductors 120 and 160, the voltage variations at point 139 due to variations in input voltage at the base 122 of transistor 125 applied through conductor 120 will be the same as the voltage input variations at the base 151 of transistor 147 due to the equal alternating current signal applied at input line 160 and there will be no voltage variation at point 183. However, upon a change in the balanced relationship of the input voltage signals applied at conductors 120 and 160, there will result a voltage at point 183 which is proportional to the difference between the alternating current signals applied at the input lines 120 and 160. Thus, the greater the difference between the voltage signal at one of the input conductors 120 or 160 relative to the other, the greater the output signal voltage at point 183.

The transistor 187 includes a collector 193 connected by a resistor 195 to the conductor 135 leading from the positive terminal of battery 136 and an emitter 197 serially connected by resistors 199 and 200 to the conductor 173 leading through resistor 175 to the negative terminal of the battery 177 and thereby to the battery 136 through grounded conductors 179 and 137.

A diode 201 has an anode element connected to the grounded conductor 121 and the cathode element connected to a point 202 intermediate resistors 199 and 200. With no signal inputs at the conductors 120 and 160, the transistor 187 remains in the nonconductive state and the collector voltage at a point 203 intermediate the collector 193 and resistor 195 is essentially equal to the positive voltage applied by battery 136, causing a positive voltage to be maintained at the base 205 of an NPN type transistor 207 through the divided resistors 209 and 211 leading from the point 203 to the grounded conductor 121, with the base 205 connected to a point 212 intermediate the divided resistors 209 and 211.

The transistor 207 includes a collector element 215 connected through a resistor 216 to the positive conductor 135 and an emitter element 217 connected by a conductor 218 to a point 219 intermediate the emitter 197 of the transistor 187 and the resistor element 199. The application of the positive voltage to the base 205 of the transistor 207 then renders the transistor 207 conductive from the collector 215 to the emitter 217, whereupon the voltage at a point 210 intermediate the collector 215 and the resistor 216 is relatively low so as to maintain the voltage at the base 220 of a transistor 222 sufficiently low so that the transistor 222 is nonconductive. The transistor 222 includes a collector element 224 connected through a resistor 225 and conductor 226 to a positive terminal of a source of direct current or battery 228 having a negative terminal connected through a conductor 230 to ground. The transistor 222 has an emitter element 232 connected through a conductor 234 to the grounded conductor 121. The maintaining of the voltage at the base 220 of the transistor 222 low so that transistor 222 is nonconductive so long as the alternating current input signals applied to the conductors 120 and 160 do not exceed a predetermined critical differential causes the output applied at a point 234 intermediate the collector and resistor 225 under such relatively balanced input signal conditions to be maintained at a relatively high value.

The low voltage at the point 210 is applied through a diode 255 having a cathode element connected to the point 210 and an anode element connected through a resistor 267 to a cathode element of a second diode 279 which in turn has an anode element connected to a cathode element of a third diode 263 which in turn has an anode element in turn connected through conductor 265 to the base of the transistor 222 so as to apply the negative going voltage at point 210 to the base 220 of the transistor 222 to maintain the transistor 222 under such conditions nonconductive.

It should be noted, however, that a conductor 236 further leads from the output point 203 of the transistor 187 to an anode element of a diode 238 having a cathode element connected by a conductor 240 to the point 234 at the collector output of the transistor 222. Further, the line 226 leading from the positive terminal of the battery 229 is connected through a conductor 240 to an anode element of a diode 242 having a cathode element connected by a conductor 245 to a cathode element of a second diode 247 having an anode element connected through a resistor 249 to the conductor 135 leading from the positive terminal of the battery 136. Also, a resistor 251 is connected at one end to the conductor 245 and at the opposite end is connected through a conductor 253 to a point 254 intermediate the anode element of the diode 255 and the resistor element 267 leading to the cathode element of the diode 269.

Furthermore, leading from the conductor 253 is a resistor element 257 connected to an anode element of a diode 259 having a cathode element connected to a conductor 261 leading to a point 262 intermediate the anode element of the diode 269 and the cathode element of a diode 263 having an anode element connected by a conductor 265 to the base 220 of the transistor 222. Also, a resistor element 267 leads from the cathode element of the diode 269 to the anode element of the diode 255 which is in turn connected through the cathode element thereof to the negative going output point 210 of the transistor 207. Further, connected between the conductor 261 and the grounded conductor 121 is a capacitor 271, and leading between the conductor 265 and the grounded conductor 121 is a resistor 273. An output conductor 275 leads from the output point 234 of the collector 224 of transistor 222.

Thus, when the base voltage at the transistor 222 is kept low so that the transistor 222 is nonconductive, it will be seen that the output across the conductor 275 and the grounded conductor 121 will be high and capable of supplying current from the source of electrical energy or battery 228 through the conductor 275 in a logic 1 state.

When the input signals applied at the lines 120 and 160 are sufficiently different as to cause a large enough positive pulse on the base 185 of the transistor 187, the transistor 187 then conducts heavily, lowering the potential at point 203 and at the base 205 of the transistor 207, whereup the transistor 207 now cuts off, raising the voltage at point 210 which then acts to back bias the diode 255 so that current heretofore diverted therethrough from the voltage dividing resistors 251 and 257 is applied to in turn back bias the diode 269 and effect through the diode 259 a back bias on the diode 263. Such back bias on the diode 263 acts to increase the effective voltage at the base 220 of the transistors 222, causing the transistor 222 to conduct and the output at the point 234 and applied through conductor 275 to go to a lower level or logic 0 state.

Thus, when the transistor 207 cuts off, causing an increase in the voltage at point 210, the transistor 222 is rendered conductive, lowering the potential at point 234 so that while transistor 222 is conducting, the diode 238 having the cathode thereof connected through conductor 240 to the low potential point 234 and the anode thereof connected through conductor 236 to the point 203 serves to maintain the point 203 and, therefore, the base 205 of transistor 207 at a low potential, effectively latching the transistor 207 in a nonconductive state regardless of the voltage at the base of the transistor 187.

The circuit may be unlatched by applying a negative bias to the base 220 of the transistor 222, causing it to cease conduction and return the output 275 to a high positive voltage output or logic 1 state.

In the actual operation of the system, the base 220 of the transistor 222 is grounded by the closure of a switch in the line 261 which connects the line 261 to ground as a function of the yaw rate washout and filter network 43, as hereinafter explained. The logic output applied through the output conductor 275 from each comparator is operatively connected to appropriate solid state logic modules, as shown in FIGURE 4.

YAW DAMPER LOGIC NETWORK

The output conductors 275(1A), 275(2A) and 275(3A) leading from the comparators 115(1A), 115(2A) and 115(3A) are shown in FIGURE 4 as leading to suitable "OR," "NAND" and "NOR" gates of conventional type, while the output conductors 275(1B), 275(2B) and 275(3B) similarly lead from the comparators 115(1B), 115(2B) and 115(3B), respectively, to such gates, as hereinafter explained in detail.

Referring now to the drawings of FIGURES 4, 5, 6 and 7, it may be noted that under normal circumstances, with the alternating current signals at input conductors 120 and 160 being in a substantially balanced condition, the outputs at the conductors 275 of all of the comparators 115(1A), 115(2A) and 115(3A), 115(1B), 115(2B) and 115(3B) are at a logic 1 state (voltage present) and it follows that the outputs of the six "OR" gate circuits 300A, 300B, 300C, 300D, 300E and 300F applied at the output lines 305, 307, 308, 309, 310 and 311 under such normal circumstances are also at a (high voltage present) logic 1 state.

Under normal conditions, there appears a logic 1 state on the inputs to all six "OR" gates 300A–300F. Therefore, the "OR" gate output is also at a logic 1 state. To translate a failure or logic 0 state on the "OR" gate output, it requires that all the inputs go to a logic 0 state. Any logic 1 state appearing on the input of an "OR" gate independent of the number of logic 0 states on that gate will translate a logic 1 state on the output.

As shown in FIGURE 4, the output conductors 305, 308 and 310 from the "OR" gates 300A, 300C and 300E are connected to the inputs of drivers 315A and 317A which may be of a type shown in FIGURE 10, each having three "AND" type inputs. The driver 315A has output conductors 318A and 319A, while the driver 317A has output conductors 321A and 323A. The output conductors 319A and 321A of the drivers 315 and 317 are serially connected and the arrangement is such that a logic 1 state (voltage present) must be present on all inputs to each driver to result in a voltage output or logic 1 state condition.

Similarly, the output conductors 307, 309 and 311 of the "OR" gates 300B, 300D and 300F, respectively, are connected to the inputs of drivers 315B and 317B which also may be of the type shown in FIGURE 10, each of the drivers 315B and 317B having three "AND" type inputs. Further, the driver 315B has output conductors 318B and 319B, while the driver 317B has output conductors 321B and 323B, with the output conductors 319B and 321B being serially connected. The arrangement is such that a logic 1 state must be present on all inputs to each of the drivers 315B and 317B to result in a voltage or logic 1 state output condition.

Thus, the drivers 315A and 317A are connected in series, as are the drivers 315B and 317B, and the "OR" gates 300A–300F are duplicated to assure that no single logic failure could render the automatic disconnect system inoperative and allow an active system failure to command rudder movement.

Figure 6:
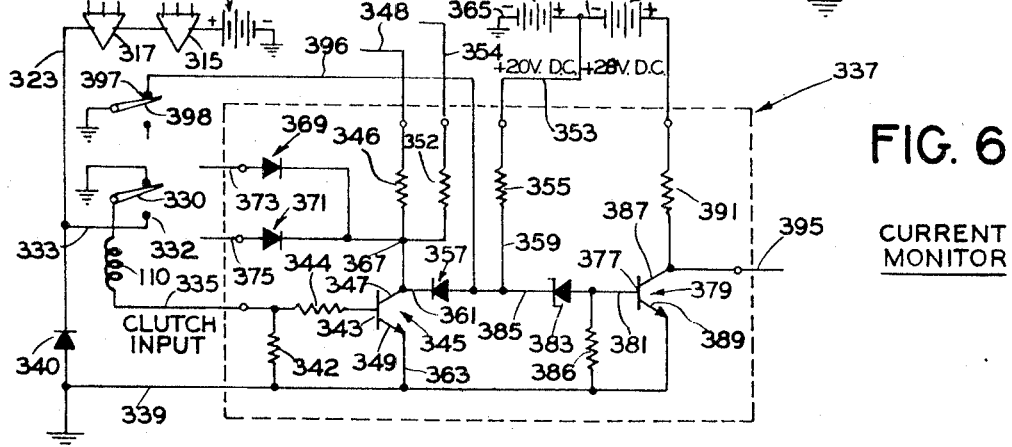
FIGURE 6 is a schematic wiring diagram of the current monitor embodied in the schematic block wiring diagram of FIGURE 4.

The drivers 315A and 317A control the supply of energizing current to operate the number one yaw damper servo clutch control solenoid 110A upon an operator-operative yaw damper engaged switch 330A being positioned so as to close switch contact 332A connected to a conductor 333A leading from the output conductor 323A and arranged, as shown in FIGURES 4, 6 and 8, to connect an energizing current from a source of electrical energy or battery 341A through the serially connected drivers 315A and 317A and through the solenoid 110A and the conductor 335A to a current monitor indicated generally by the numeral 337A, which may be of a type shown schematically in FIGURE 6, and through the current monitor circuit, which provides a low resistance, to a grounded conductor 339A. A diode 340A, as shown in FIGURES 4 and 6, has a cathode element connected to the conductor 323A and an anode element connected to ground to provide arc suppression upon the operator-operative switch 330A being positioned so as to open switch contact 332A.

Similarly, the serially connected drivers 315B and 317B supply current from a source of electrical energy or battery 341B to operate the number two yaw damper servo clutch control solenoid 110B upon an operator-operative yaw damper engaged switch 330B being positioned so as to close a switch contact 332B connected to a conductor 333B leading from the output conductor 323B and arranged to apply an electrical current from the battery 341B through the serially connected drivers 315B and 317B and through the solenoid 110B and conductor 335B to a current monitor 337B, which may be of a type such as shown schematically in FIGURE 6, which provides a low resistance, to a grounded conductor 339B. A diode 340B, as shown in FIGURES 4 and 6, has a cathode element connected to the conductor 323B and an anode element connected to ground to provide arc suppression upon the operator-operative switch 330B being positioned so as to open switch contact 332B.

The logic and disconnect circuitry for each servo control clutch solenoid 110A and 110B is identical, although powered from separate direct current supplies 341A and 341B, as shown schematically in FIGURE 4.

CURRENT MONITOR

FIGURE 6 shows the current monitor circuit which supplies logic indicating clutch engagement upon the energizing current being supplied to the solenoid 110. Thus, when the operator-operative switch 330 closes contact 332 and current is applied by battery 341 through the solenoid control clutch 110, there is a current flow through a resistor 342 to the grounded conductor 339 and the voltage drop across the resistor 342 is such that a positive voltage is applied through a resistor 344 leading from the conductor 335 to a base 343 of an NPN type transistor 345 having a collector element 347 and an emitter element 349.

Moreover, as shown in FIGURE 6, the collector element 347 of the transistor 345 is connected through a conductor 367, resistor 346 and conductor 348 to the positive terminal of battery 40, as shown in FIGURE 8, and through resistor 352 and conductor 354 to the positive terminal of a battery 356, as shown in FIGURE 8, upon the operator-operative knob 655 being operated so as to cause switch 650 to open a contact 651 and close a contact 652 and switch 653 to open a contact 654 and close a contact 656. The negative terminals of both battery 40 and battery 356 are connected to a common ground.

The positive terminal of another battery or source of direct current 351, as shown in FIGURE 6, is connected through a conductor 353, a resistor 355, and a conductor 359 to an anode element of a diode 357 having a cathode element connected through a conductor 361 to the collector element 347. The emitter element 349 of the transistor 345 is connected by a conductor 363 to the conductor 339 leading to a common ground. The battery 351 has its negative terminal connected to a common ground through a conductor 365 so as to thus complete the electrical circuit through the transistor 345.

Thus, when a positive voltage is applied on the base 343 of the transistor 345 upon the solenoid winding 110 being energized, the transistor 345 is caused to conduct electrical energy heavily between the collector 347 and the emitter 349 with the emitter voltage being essentially at ground. Further, it will be seen that there is connected to the collector element 347 through the conductors 367 and 368 the cathode elements of diodes 369 and 371 having anode elements connected to conductors 373 and 375.

Thus, at the time a positive voltage is applied to the base 343 of the transistor 345 indicative of energization of the servo clutch control solenoid 110, the logic outputs at the conductors 373 and 375 have a low voltage or logic 0 state due to the resulting conductive state of transistor 345.

Furthermore, the conductive state of the transistor 345 upon the energization of the control solenoid 110 in effect clamps a base 377 of a second NPN transistor 379 to ground inasmuch as the base 377 of the transistor 379 is connected through a conductor 381 to an anode element of a diode 383 having a cathode element connected by a conductor 385 to the anode element of the diode 357 which in turn has a cathode element connected by the conductor 361 to the collector 347 which is at a low potential in such conductive state of transistor 345. The conductor 381 leading from the base 377 is connected to ground through a resistor 386 leading to the grounded conductor 339.

Further, it will be seen that the second transistor 379 has an emitter element 389 connected to the grounded conductor 399 and a collector element 387 connected through a resistor 391 to the positive terminal of a source of direct current 393 which has its negative terminal connected by a conductor 394 to the positive terminal of the source of direct current 351. The effect then of clamping the base 377 of the transistor 379 to ground by the conductive state of the first mentioned transistor 345 prevents the transistor 379 from conducting and keeps the logic state of an output conductor 395 leading from the collector 387 of the transistor 379 at a (voltage present) logic 1 state upon energization of the control solenoid 110.

It will be further noted that, as shown in FIGURE 6, the current monitor 337 includes a conductor 396 which leads from the conductor 385 to a contact 397 which, during inoperation of the system, is closed by a switch element 398 connected to ground and operative by suitable relay means, as hereinafter explained, in the yaw rate washout and filter units 43A and 43B so as to clamp the base 377 of the transistor to ground during such times as the yaw damper engaged control 655 is at the "OFF" position. However, upon the control 655 being operated to the "ON" position, the switch element 398 is operatively positioned so as to open the contact and disconnect the conductor 396 from the ground and render current monitor 337 effective for operation.

Thus, in normal operation, upon deenergization of the control solenoid 100, as upon a failure thereof, the voltage applied to the base 343 drops to a low or ground potential, whereupon the transistor 345 becomes nonconductive, and the resulting increased positive voltage applied at the collector element 347 through conductors 348 and 354 back biases the controlling diodes 369 and 371 so that the logic of output conductors 373 and 375 changes to a (voltage present) logic 1 state. Further, such positive voltage applied at the collector 347 acts to back bias the diode 357 which in turn causes the positive voltage applied by the battery 351 to back bias the diode 383, whereupon a resulting voltage drop across the resistor 386 applies a positive voltage bias to the base 377 of the transistro 379, whereupon the transistor 379 becomes conductive so that the logic state at the output conductor 395 changes to a low voltage or logic 0 state upon such failure or deenergization of the solenoid winding 110.

In effecting the (voltage present) logic 1 state of the conductors 373 and 375, it should be noted that the same are connected, respectively, to inputs of drivers 400 and 402 which may be of a type shown by FIGURE 10, each having two "AND" type inputs forward biased, as shown in "FIGURE 10, to effect the (high voltage present) logic 1 state of the conductors 373 and 375 upon the control diodes 369 and 371 being back biased as explained.

The two inputs of the driver 400 as shown in FIGURE 4, are connected, respectively, to the output conductor 373A from the servo current monitor 337A and to the output conductor 373B from the current monitor 337B, while the driver 402 has one input connected to the output conductor 375A from the curent monitor 337A and a second input connected to the output conductor 375B from the current monitor 337B.

Thus, each of the drivers 400 and 402 have one input from each of the servo current monitors for the servo clutch control solenoids 110A and 110B. The operative characteristics of these drivers 400 and 402 are such that both inputs to the driver must be of a logic 1 state to effect a (high voltage present) logic 1 at the output of the driver to cause illumination of the light 404 connected to the output line 410 from the driver 400 and the light 406 connected to the output conductor 412 of the driver 402.

Thus, as shown in FIGURE 6, the conductors 373A and 373B and 375A and 375B would be in a (low voltage) logic 0 state when energizing current is applied through the solenoid 110, thereby applying a positive voltage to the base 343 of the transistor 345. In order for both inputs to the drivers 400 and 402 to be in a logic 1 state, energization of both of the control solenoid 110A and 110B for the clutches 85A and 85B must cease to render the transistor 345 of both current monitors nonconductive to apply a back bias to the control diodes 369 and 371 of both monitors 337A and 337B in order for the inoperative indicator lights 404 and 406 to be illuminated and thus indicate such state.

FAULT LIGHT

An additional driver 420 is provided which may be of a type shown in FIGURE 11, having two "OR" type inputs and a pair of input conductors 422 and 424 so arranged that (high voltage present) logic 1 input applied to either conductor 422 or 424 will cause illumination of a fault light 432 by applying electrical energy to an output conductor 426 and through a diode 428 to a filament of a fault light 432 having an opposite terminal connected to a grounded terminal 434.

Two "NAND" gates 440 and 442 of conventional type are provided to control energization of the two input conductors 422 and 424, respectively, and for the driver 420. Leading to the inputs of the "NAND" gate 440 are the output conductors 275(1A), 275(2A) and 275(3A) leading from the respective outputs of the comparators 115(1A), 115(2A) and 115(3A), while leading to the inputs of the "NAND" gate 442 are output conductors 275(1B), 275(2B) and 275(3B) as well as output conductors 395A and 395B from the current monitors 337A and 337B as well as an output conductor 445 leading from a module fail indicator 450, the wiring diagram of which is shown schematically in FIGURE 5.

The output conductors from each of the comparators 115(1A), 115(2A) and 115(3A) and 115(1B), 115(2B) and 115(3B), the output conductors 395A and 395B from the respective current monitors 337A and 337B, and the output conductor 445 from the module fail indicator 450 provide inputs to the "NAND" gate circuits 440 and 442 to control illumination of the fault light 432 and these are normally at a (high voltage present) logic 1 state. However, should any of the comparators, the current monitors, or the module fail indicator sense an alarm condition, there would be then effected a change in the corresponding output conductor to a (low voltage) 0 logic state, whereupon the output of the associated "NAND" gate module 440 and 442 will go to a (high voltage present) logic 1 state and cause the driver 420 to turn the fault light 432 on and effect energization of a fault relay winding 448 connected at one end to the conductor 430 and at an opposite end to a grounded conductor 449 to effect a control action, as hereinafter explained. The fault light 432 requires no immediate action on the part of the pilot, but is simply noted for information.

MODULE FAILURE INDICATOR

Figure 5:
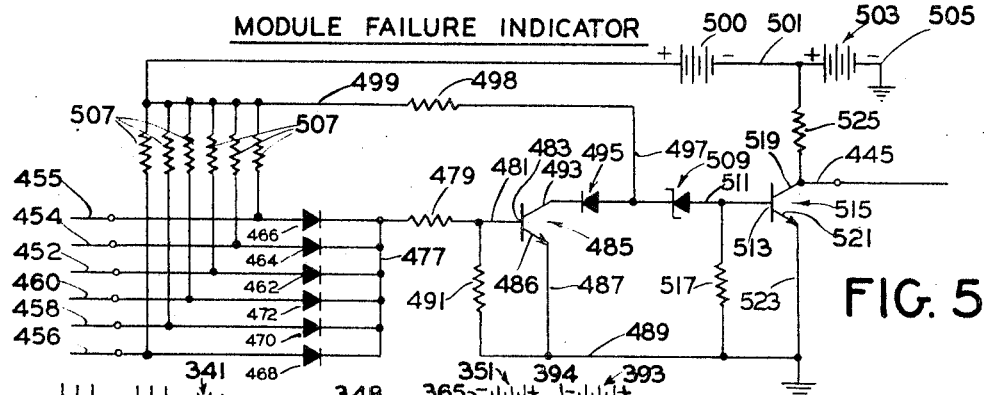
FIGURE 5 is a schematic wiring diagram of the module failure indicator embodied in the schematic block wiring diagram of FIGURE 4.

The module failure indicator 450, as shown in FIGURE 5, includes input conductors 452, 454, 455, 456, 458 and 460 leading from the respective output conductors 305, 308, 310, 307, 309 and 311 of the "OR" gates 300A, 300C, 300E, 300B, 300D and 300F and which, under normal circumstances as heretofore explained, are at a (high voltage present) logic 1 state. These input conductors, as shown in FIGURE 5, lead to the anode element of diodes 462, 464, 466, 468, 470 and 472, respectively. These diodes in turn have a cathode element connected by a conductor 477 to one end of a resistor 479, the opposite end of which is connected by a conductor 481 to a base 483 of an NPN type transistor 485.

The transistor 485 has an emitter element 486 connected by a conductor 487 to a grounded conductor 489, while a resistor 491 is connected between the base 483 and the grounded conductor 489. The transistor 485 has a collector element 493 connected to the cathode element of a diode 495 having an anode element connected through a conductor 497, a resistor 498 and a conductor 499 to a positive terminal of a source of electrical energy or battery 500. The negative terminal of the battery 500 is connected by a conductor 501 to the positive terminal of a second source of direct current 503 which has a negative terminal connected to ground through a conductor 505.

Further, the conductor 499 leading from the positive terminal of the battery or source of direct current 500 has suitable resistor elements 507 leading to the respective input conductors 452, 454, 455, 456, 458 and 460. Also leading to the conductor 497 is a cathode element of a diode 509 having an anode element connected by a conductor 511 to a base 513 of a transistor 515. A resistor 517 is connected between the conductor 511 and the grounded conductor 489.

The transistor 515 has an emitter element 521 which is connected through a conductor 523 to the grounded conductor 489 and a collector element 519 connected by a resistor 525 to the positive terminal of the source of direct current or battery 503 having a negative terminal connected to a grounded conductor 505. The output conductor 445 leads from the collector element 519 of the NPN type transistor 515.

The arrangement is such then that so long as the positive voltage or logic 1 state is applied through the input conductors 452–460, the voltage applied to the base 483 of the transistor 485 will render the same conductive and in turn cause a negative charge to be applied to the base 513 of the transistor 515 through the diodes 495 and 509, rendering the transistor 515 nonconductive and a high voltage or logic 1 state condition to be applied at the output conductor 445.

However, upon all of the input conductors 452–460 going to a low voltage condition or 0 logic state, a negative charge will then be applied to the base 481 of the transistor 485 which will render the transistor 485 nonconductive and in turn cause the high voltage charge applied through the conductor 497 from the positive terminal of the battery 500 to back bias the diode 509, increasing the positive voltage applied across the resistor 517 to the base 513 of the transistor 515 so that the transistor 515 is then rendered conductive and the voltage applied at the output conductor 445 reduced to a (low voltage condition) logic 0 state.

In such operation, if any one of the conductors 452–460 changes from such low voltage state or remains in a (positive high voltage) logic 1 state, the positive voltage then applied through the corresponding one diode 462–470 would increase the positive voltage applied to the base 483 of the transistor 485, whereupon the transistor 515 would once again become nonconductive and the output applied through the conductor 445 increased to a (high voltage present) logic 1 state or non-alarm condition. However, upon the output conductor 445 changing from the non-alarm logic 1 state to the alarm logic 0 state, there would then be effected through the "NAND" gate 442 and driver 420 an alarm state causing the fault light 432 to be illuminated. The fault light 432 would, of course, be illuminated in the case any of the input conductors 275(1A), 275(2A), 275(3A), 275(1B), 275(2B), 275(3B), 395A, 395B or 445 should go from the (high voltage present) logic 1 state to the (low voltage present) logic 0 state.

LEVEL SENSOR

Figure 7:
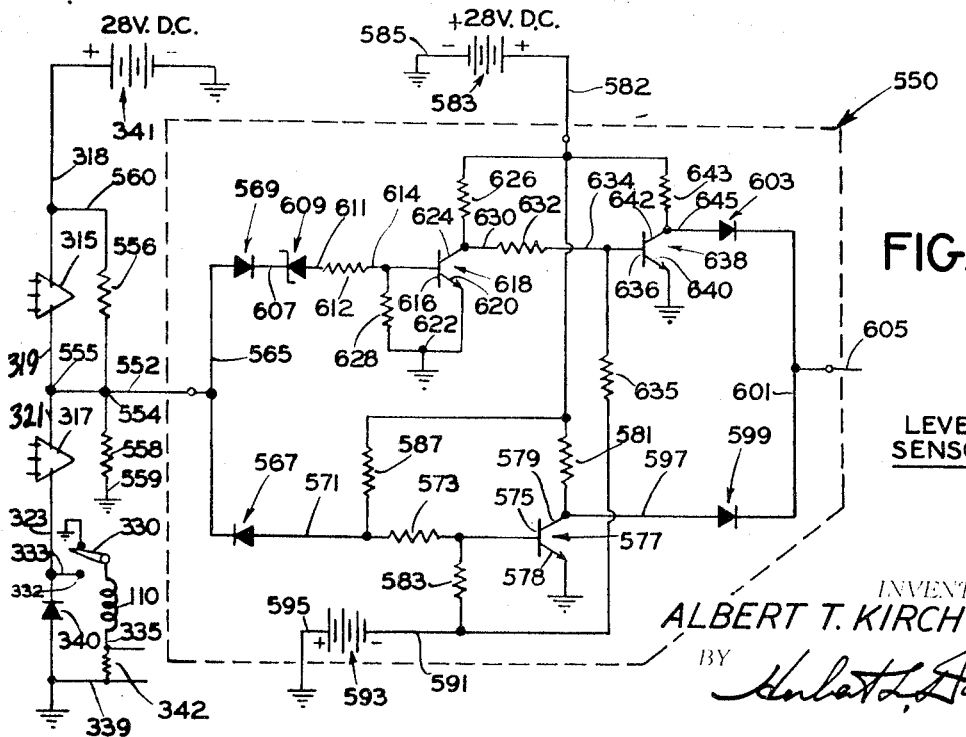
FIGURE 7 is a schematic wiring diagram of the level sensor embodied in the schematic block wiring diagram of FIGURE 4.

Further, as shown in FIGURE 4, there are provided level sensors indicated generally by the numerals 550A and 550B which may be of the type indicated schematically in FIGURE 7 including an input conductor 552 leading from a point 554 intermediate a pair of resistors 556 and 558 and a point 555 intermediate the serially connected output conductors 319 and 321. The resistor 556 is connected by a conductor 560 to the conductor 318 leading to the positive terminal of a source of electrical energy or battery 341, while the resistor 558 is connected to ground by a conductor 559. The battery 341 has a negative terminal connected to a common ground and is so arranged as to provide a source of electrical energy for the serially connected drivers 315 and 317, heretofore described.

The input conductor 552 leads to a conductor 565 connected at one end to a cathode element of a diode 567 and at the opposite end to an anode element of a diode 569. The diode 567 in turn has an anode element connected through a conductor 571 and resistor 573 to a base 575 of an NPN type transistor 577. The NPN type transistor 577 has an emitter element 578 connected to ground and a collector element 579 connected through a resistor 581 and conductor 582 to a positive terminal of a battery 583 having a negative terminal connected through a conductor 585 to a common ground.

Also connected between the conductor 582 and the conductor 571 is a resistor element 587 and leading from the base element 575 is a resistor 589 which is in turn connected to a conductor 591 leading to a negative terminal of a battery 593 having its positive terminal connected to a common ground through a conductor 595. There leads from the collector element 579 an output conductor 597 connected to an anode element of a diode 599 having its cathode element connected to a conductor 601, the opposite end of which is connected to the cathode element of a diode element 603. Also leading from the conductor 601 is an output conductor 605.

Further, the input diode 569 has a cathode element connected through a conductor 607 to a cathode element of a Zener diode 609 having a reverse current breakdown characteristic at a critical voltage to effect the operation of the level sensor, as hereinafter explained. The Zener diode 609 has an anode element connected through a conductor 611 to a resistor 612 which is in turn connected through a conductor 614 to a base element 616 of an NPN type transistor 618. The transistor 618 has an emitter 620 connected by a conductor 622 to common ground and a collector element 624 connected through a resistor 626 to the conductor 582 leading from the positive terminal of the source of direct current or battery 583. Also connected from the conductor 614 leading to the base element 616 is a resistor 628 which is in turn connected to the conductor 622 leading to the common ground.

Further, leading from the collector element 624 of the transistor 618 is an output conductor 630 connected to a resistor 632 which is in turn connected through a conductor 634 to a base element 636 of a second NPN type transistor 638 having an emitter element 640 connected to common ground and a collector element 642 connected through a resistor 643 to the conductor 582 leading to the positive terminal of the source of electrical energy or battery 583. Further, leading from the collector 642 of the transistor 638 is an output conductor 645 which is connected to an anode element of the diode 603 and thereby to the output conductors 601 and 605.

The arrangement of the level sensor 550 is such that upon the driver elements 315 and 317 being normally operative and not shorted, the voltage drop across the resistor element 556 and sensed at the input conductor 552 will be equivalent to approximately half that of the voltage of the battery 341 and, in the case of a 28-volt direct current source, as shown, the input voltage at the conductor 552 under such normal operating conditions would be 14 volts.

Such input voltage applied then through the diode 569 would not be sufficient to effect a reverse current flow through the Zener diode 609 which is so selected as to have a higher reverse current breakdown voltage characteristic than that provided under such normal operating conditions. The Zener diode 609 thus blocks a flow of current therethrough from conductor 607 to the conductor 611 and prevents the application of a high voltage therethrough to the base 616 of the transistor 618 under such normal operating conditions. Furthermore, the voltage thus applied through the input conductor 552 to the cathode element of the diode 567 would back bias the diode 567 so as to render the battery 583 effective to cause a flow of current through the conductor 582, resistors 587, 573 and 589 and conductor 591 to the negative terminal of the battery 593 and in turn apply a positive voltage due to voltage drop across the resistor 589 to the base 575 of the transistor 577, while simultaneously the battery 583 is rendered effective to cause a flow of current through the conductor 582, resistor 626, conductor 630, resistor 632, conductor 634, resistor 635, and conductor 591 to the negative terminal of battery 593 and in turn apply a positive voltage due to voltage drop across the resistor 635 to the base 636 of the transistor 638 and thereby render the respective transistors 577 and 638 conductive to provide a low voltage or negative output at the respective collector output conductors 597 and 645 connected to the anodes of the diodes 599 and 603 so as to effect at the conductor 601 and output conductor 605 a low voltage or logic 0 state under such normal operating condition of the serially connected drivers 315 and 317.

On the other hand, if the driver 315 should have become shorted, the full voltage of the battery 341, in the example given a full 28 direct current voltage, would be applied to the input conductor 552, which voltage would then be applied through the diode 569 to the Zener diode 609. The Zener diode 609 is so selected as to have a reverse current breakdown characteristic at such high voltage so as to permit a reverse flow of current through the Zener diode 609 from the conductor 607 to the conductor 611 and through voltage dividing resistors 612 and 628 to the grounded conductor 622. The voltage drop across resistor 628 then causes a positive voltage to be applied to the base 616 of the transistor 618, thereby rendering the transistor 618 conductive, causing in turn a low voltage or negative charge to be applied through the conductor 630, resistor 632 and conductor 634 to the base 636 of the second NPN type transistor 638. The low voltage thus applied to the base 636 of the transistor 638 then renders this second transistor 638 nonconductive, whereupon a high output voltage will be applied through the output conductor 645, diode 603, conductor 601 and output conductor 605, indicating an alarm or (high voltage present) logic 1 state.

Further, if the driver 317 should short, irrespective of whether the driver 315 was operative or not or in a shorted condition, the voltage sensed at the input conductor 552 would be zero or ground potential since the conductor 552 would be connected directly to ground through the shorted driver 317. In such condition, the zero or ground potential voltage applied at the input conductor 552 would then cause a flow of current from the base 575 of the transistor 577 through resistor 573, diode 567 and conductors 565 and 552 to ground. This in turn would apply a low voltage of ground potential to the base 575 of the transistor 577 to render the transistor 577 nonconductive and a high output voltage at the output conductor 597 which would be applied through the diode 599 to the output line 605 to provide a positive output indicative of an alarm or logic 1 output condition.

The output conductors 605A and 605B lead from the level sensors 550A and 550B to inputs of a "NOR" gate 610 of a conventional type and having other inputs to which lead output conductors 395A and 395B leading from the current monitors 337A and 337B as well as inputs to which lead output conductors 275(1A), 275(2A) and 275(3A) from the respective comparators 115(1A), 115(2A) and 115(3A); inputs to which lead output conductors 275(1B), 275(2B) and 275(3B) from the respective comparators 115(1B), 115(2B) and 115(3B) as well as an input to which leads output conductor 445 from the module failure indicator 450. An output conductor 612 leads from the "NOR" gate 610 to an input of a driver 614 of a type such as shown diagrammatically in FIGURE 10.

The "NOR" gate 610 is effective upon a high positive voltage indicative of a logic 1 state being applied through any one of the aforenoted output conductors to the input of the "NOR" gate 610 to apply a low voltage to an output conductor 612 leading to an input of the driver circuit 614 having an output conductor 616 connected through a diode 618 to one terminal of a filament 620 of a monitor test lamp 622 having an opposite terminal connected through a conductor 624 to ground. The driver circuit 614 upon such low voltage input from the "NOR" gate 610 maintains the filament of the monitor test lamp deenergized.

However, only upon all of the output conductors connected to the input of the "NOR" gate 610 being at a ground potential or at a logic 0 state is the "NOR" gate 610 then effective to provide a (high voltage present) logic 1 state at the output conductor 612 leading to the driver circuit 614. The driver circuit 614 is thereupon effective to provide a (high voltage present) logic 1 state at the output conductor 616 so as to apply electrical energy through the diode 618 to the filament 620 of the monitor test light and through the grounded conductor 624 so as to energize the filament 620 and illuminate the monitor test light 622.

It will be further noted that while the conductors 605A and 605B leading to the "NOR" gate 610 from the level sensors 550A and 550B are normally at (low voltage present) logic 0 state, the remainder of the conductors 275, 395 and 445 are normally at (high voltage present) logic 1 state and shift to the (low voltage present) logic 0 state upon a failure. However, as hereinafter explained and shown graphically in FIGURE 12, shortly after initiation of phase 2 of the push-to-test sequence, the comparators 115(1A), 115(2A), 115(3A), 115(1B), 115(2B) and 115(3B) each have one of the compared inputs thereof shorted by the selectively operable switches 650(1A), 650(2A), 650(1B) and 650(2B), whereupon the conductors 275, 395 and 445 shift to the (low voltage present) logic 0 state which, upon the conductors 605A and 605B normally continuing at the (low voltage present) logic 0 state, then cause the "NOR" gate 610 to effect the illumination of the monitor test light 622 as indicative of a satisfactory completion of the logic interrogation portion of phase 2.

Furthermore, the shifting to the (low voltage present) logic 0 state of the conductors 275, 395 and 445 at the initiation of phase 2 of the push-to-test sequence causes the "NAND" gates 440 and 442 to effect energization of the fault relay 448 which, as hereinafter explained, conditions a check reset light 725 for illumination through operation of a timing circuit 682 upon satisfactory completion of phase 2 of the push-to-test sequence, as hereinafter explained and shown graphically at FIGURE 12. It is also of significant importance that at the end of phase 2 the monitor test light 622 remains illuminated. Since at this time all command signals have returned to null, and, therefore, no error signals are present, the comparators must remain in the alarm mode. The fact that the monitor test light 622 remains illuminated is a positive indication that all comparators have indeed been locked in the failure mode.

DETAILED PRE-FLIGHT TEST CIRCUITRY

A pre-flight test circuitry is implemented as shown in FIGURE 8 in which the positive terminal of the source of direct current energy or electrical power 40 is selectively connected upon a switch arm 650 under control of a manually operable control member 655 selectively closing a contact 652, whereupon the test may be initiated upon a second switch member 657 closing a contact 659 when the aircraft is on the ground by the operation of suitable linkage 661 connecting the switch to the landing equipment of the aircraft.

Thus, upon the switch 650 closing the contact 652 and the switch 657 closing the contact 659, the test operation may then be initiated by the operator pushing a test button 663 which is in turn operably connected to suitable switch elements 665, 669, 673 and 677 so as to cause switch element 665 to close a contact 667, switch element 669 to close a contact 671, switch element 673 to close a contact 675, and switch element 677 to close a contact 679. The switch elements 665, 669, 673 and 677 are normally biased by suitable spring means indicated schematically by numeral 678 to the positions shown and opening the several switch contacts.

However, upon the test button 663 being thus operated to cause the switch element 665 to close the contact 667, the positive source of electrical energy from the battery 40 is then applied to a conductor 680 leading to an input to a timing circuit 682, shown in detail in FIGURE 9 and explained in detail heerinafter.

Moreover, upon the switch 665 closing the contact 667, electrical energy from the battery 40 is applied through a conductor 683 to an electromagnetic winding 685 having an opposite terminal connected through a conductor 687 to ground. The electromagnetic winding 685, upon energization, acts upon an electromagnetic core 689 operably connected to the switch elements 665, 669, 673 and 677 so as to overcome the biasing force of spring 678 and hold the switch elements 665, 669, 673 and 677 and the test push button 663 in the actuated position, whereupon the button 663 need not be held manually by the operator during the test.

Furthermore, the test timer circuit 682, shown in FIGURE 9 and energized by the switch element 665 closing contact 667 upon the actuation of the test button 663 has timer characteristics, as hereinafter explained, that are such as to provide a positive output voltage at output conductor 690 after the input voltage at the line 680 has been continually supplied to the timing circuit 682 for a predetermined time interval controlled by the timing circuit 682.

When either the electrical power applied at the input conductor 680 to the timing circuit 682 is removed from the timer or the output at line 690 interrupted, the output from the timer 682 a conducor 690 ceases immediately and the timer 682 is reset to begin another timing cycle, as hereinafter explained.

Furthermore, after a predetermined interval of time following initial application of electrical power to the input conductor 680 to the timing circuit 682, the timing circuit applies a positive output voltage to the output conducor 690 whch is connected to an anode element of a diode 692 having a cathode element connected through a conductor 694 to a switch arm 696 which is biased by a suitable spring indicated schematically by the numeral 697 into the lower position shown in FIGURE 8 closing a switch contact 698.

The contact 698 is connected through a conductor 700 to a winding 702 having an opposite terminal connected to a grounded conductor 704. Thus, the positive output voltage from the timing circuit 682 is effective upon the switch arm 696 closing the contact 698 to energize the test relay winding 702 by a circuit leading from a source of electrical energy or battery 705 having a positive terminal connected to a conductor 707 leading to the timing circuit 682 and a negative terminal connected through a conductor 709 to a common grounded terminal, as hereinafter explained in reference to the timing circuit of FIGURE 9.

Thus, after a predetermined time controlled by the timing circuit 682, the application of power to the input conductor 680 of the timing circuit 682 causes the battery 705, as shown by FIGURES 8 and 9, to supply a positive output voltage to the conductor 690 and energize the test relay winding 702 through the switch arm 696 biased by the spring 697 into a position to close switch contact 698 of the fault relay 448 to complete phase 1 of the push-to-test sequence, illustrated graphically by FIGURE 12.

During this phase 1 of the test, the three rate gyroscopes 10A, 10B and 10C are torqued to simulate a steady yaw rate by means of electrical power supplied through a switch element 715 which is mechanically connected with switch elements 650(1A), 650(2A), 650 1B) and 650(2B) and biased therewith by a suitable spring 716 to the upper position shown in FIGURE 8, so that switch element 715 closes a switch contact 717. The switch element 715 is connected by a conductor 719 to the input conductor 680 leading to the timing circuit 682, while the contact 717 is connected by a conductor 720 to the respective switch arms 669, 673 and 677 which are held in opposition to the spring 678 in a position closing the switch contacts 671, 675 and 679, respectively, under the electromagnetic force effected by the energization of the holding coil 685 upon the closing of the switch contact 667 by the switch arm 665 on the actuation of the operator-operative push button 663.

The switch contact 671, 675 and 679 are in turn connected through conductors 681, 683 and 685 to a switch mechanism 38, shown schematically by FIGURE 2, and through switch elements 28A, 28B and 28C closing switch contacts 36A, 36B and 36C so as to energize the torquing windings 34A, 34C and 34B, shown schematically in FIGURE 8, of the respective rate gyroscopes 10A, 10B and 10C which, as heretofore explained, may be of the type shown and described in the copending U.S. application Ser. No. 327,268, filed Dec. 2, 1963, by Alex Morsewich, now U.S. Patent No. 3,240,050, and assigned to The Bendix Corporation.

This torquing action, however, is terminated upon the test relay 702 being energized by the output from the timing circuit 682 after the predetermined time delay period controlled thereby. However, prior to this output signal being applied by the timing circuit 682 at the output conductor 690, the three signal chains are exercised by the application of the simulated yaw rate, and the yaw rate washout and filter circuits of 43A, 43B and 43C, shown in FIGURE 2 and in detail by FIGURE 13, as hereinafter explained, serve to wash out the yaw rate command and the servo motors 65A, 65B and 65C effect command rudder movements in accordance with the outputs of the filter circuits 43A, 43B and 43C. This normally is accomplished without any alarms from any of the comparators 115(1A), 115(2A), 115(3A), 115(1B), 115(2B) and 115(3B) indicating that the system is completely operational.

If a comparator alarm should occur during the phase 1 of the test, the fault light 432 and the fault relay 448 will be energized. The energization of the fault relay 448 will in turn cause the electromagnetic force of the relay winding 448 to actuate the switch element 696 on opposition to the biasing spring 697 and out of closing relation with the switch contact 698 and into an upper position closing a switch contact 728. Such opening of the switch contact 698 renders the timer 682 ineffective to energize the test relay winding 702. However, the closing of the switch contact 728 by the switch 696 connects to the output line 694 of the timer 682 a check reset light 725 having a filament 726 which will be energized upon the timer 682 applying an output voltage through the conductor 694 on the expiration of the predetermined time relay provided by the timer 682. The illumination of the check reset light 725 will indicate a need to check the operation of the system.

However, upon successful completion of the system performance segment of the test of phase 1, the test relay winding 702 is energized as a function of the timer 682 so as to generate an electromagnetic force which acts upon an electromagnetic care 733 mechanically connected to the switch elements 715, 650(1A), 650(2A), 650(1B) and 650(2B). The energization of the winding 702 then actuates in opposition to the biasing force of spring 716 the switch element 715 from a position closing the switch contact 717 to a position opening the switch contact 717 and closing a switch contact 730 connected through a conductor 732 to the conductor 700 so as to provide a holding circuit for retaining the test relay winding 702 in an energized condition.

The latter action of the switch element 715 in opening the switch contact 717 and closing the switch contact 730 removes the power from the circuit for energizing the gyro torquing windings 34A, 34B and 34C, allowing the rate gyroscopes 10A, 10B and 10C to return to neutral and locks the test relay winding 702 by the closing of the contact 730 in the energized condition.

The energization of the test relay winding 702 simultaneously with the actuation of the switch element 715 also actuates the yaw damper push-to-test control switches 650(1A), 650(2A), 650(1B) and 650(2B) from a position closing switch contacts 648, 750, 752 and 754 connecting, respectively, one of the inputs of each of the comparators 115(1A), 115(2A), and 115(3A) to the outputs of the yaw rate washout and filter devices 43A, 43B and 43C and one of the inputs of each of the comparators 115(1B), 115(2B) and 115(3B) to the outputs of the follow-up synchros 96A and 96B to an alternate position in which the switches 650(1A), 650(2A), 650(1B) and 650(2B) open the aforenoted contacts and close contacts 760, 762, 764 and 766 so as to ground the one input of each of such comparators, as shown schematically in FIGURES 2, 2A and 8.

Since the filter devices 43A, 43C and 43B have at the time of the grounding of such comparators washed out the yaw rate supplied by the torqued gyros 10A, 10B and 10C, as hereinafter explained, the filter devices 43A, 43B and 43C now induce during phase 2 of the test an output of equal amplitude but of opposite polarity from that of the phase 1 test, as shown graphically in FIGURE 12. Such filter output and resulting servo rotation follow-up signals generated by the synchros 96A, 96B and 96C appear at only one input of each comparator (the other input being grounded by the test relay switches 650(1A), 650(2A), 650(1B) and 650(2B), as heretofore explained) causing an alarm from all of the comparators when the comparator threshold is exceeded.

Since any one of these alarms causes the fault light 432 to illuminate and the fault relay winding 448 to be energized, operation of the fault relay 448 will thereupon be effected. The energization of the fault relay winding 448 actuates an electromagnetic core 699 mechanically connected to the switch element 696 in opposition to the spring 697 and from the position shown in FIGURES 4 and 8 to a position closing the switch contact 728 to momentarily interrupt the output circuit of the timer 682. This mechanical action of the relay switch element 696 serves to momentarily interrupt the output circuit for the timer 682 over a time interval measured in milliseconds (for example, 4 milliseconds maximum) of greater time duration than the resequencing time interval of the timer 682 as controlled by the silicon controlled rectifier 833 which effects the resequencing action over a time interval measured in microseconds (for example, less than 100 microseconds) of a much shorter duration so that as a result of the opening of the contact 698 by the switch element 696 under the electromagnetic force of the relay winding 448 there is effected a resequencing of the timer 682 as shown in detail in FIGURE 9 and described hereinafter. The energized fault relay 448 thereby switches the output of the timer 682 from the test relay winding 702 of FIGURE 8 to the check reset light 725, the illumination of which is effected at the expiration of phase 2 of the test sequence and second predetermined time interval effected by the timer 682.

The alarm of all comparators causes the system to disengage totally due to the action of the "OR" gates 300A–300F which thereupon effectively deenergize the clutch control solenoids 110A and 110B, while the current monitors 550A and 550B thereupon cause the illumination of the yaw damper inoperative lights 404 and 406. The module failure indicator circuit 450 and the monitor logic of the "NOR" gate 610 will cause the monitor light 622 on the control panel to light when all six comparators alarm, logic at points A, B, C, D, E and F go to logic 0, current monitors 337A and 337B indicate that the servo clutch control solenoids 110A and 110B have become deenergized and that the respective clutches 87A and 87B disengaged and that the level sensors 550A and 550B (FIGURES 4 and 7) respond to the proper voltage. If any one of the servo clutch drivers 315A, 317A, 315B and 317B does not open as commanded by the logic, that level sensor 550A or 550B will provide at output conductor 605 thereof an alarm voltage (high voltage present) logic 1 state, while under proper operating conditions there will be provided at both output conductors 605 a (low voltage present) logic 0 state. Thus, illumination of the monitor test light 622 during the test phase 2, as shown graphically by FIGURE 12, is assurance that the monitoring and automatic disconnect circuitry is functioning normally.

The system is given a predetermined time period (by the timer 682) to wash out the change in the yaw rate signal and return to normal null signals at the inputs of the comparators 115(1A), 115(2A) and 115(3A).

The comparator memory is then assured by the monitor light 622 remaining on at the end of the time period of test phase 2. The output of the timer 682 at conductor 690 at the end of such time period then energizes the check reset light 725 on the control panel through contact 728 which has been closed by the fault relay switch 696 due to the energization of the fault relay winding 448 at the initiation of the test phase 2, as heretofore explained. If the test is operated satisfactorily, both yaw rate inoperative lights 404 and 406, the fault light 432 and the monitor light 622 and the check reset light 725 will be illuminated. The system will remain in this condition until reset by returning the operator-operative switch control member 655 to the "OFF" position shown in FIGURE 8 and then to the lower "ON" position after which it is ready for service. FIGURE 12 illustrates graphically the time history of the aforenoted test procedure.

All of the off-line logic monitors are also cross monitored to detect active and passive failures. Outputs of the monitors are fed into the fault and monitor test logic gates. This cross comparing of complementary logic insures that no circuit has failed actively prior to initiating the self-test procedure and, once the test is started the failure of these circuits to operate is also detected. This technique insures the absolute integrity of the logic.

YAW DAMPER LOGIC AND DISCONNECT SYSTEM

The six system comparators 115(1A), 115(2A), 115(3A), 115(1B), 115(2B) and 115(3B) are capable of detecting any operational failures in the system. Thus, in the case of a failure of a rate gyro or yaw rate filter, it will be noted that comparator 115(1A) would sense the difference between the signal output of filter 43A and filter 43B and, if the difference is greater than a predetermined threshold, the comparator 115(1A) will alarm. This failure will also be detected by comparator 115(2A), since there will be a difference between the outputs of filters 43B and 43C. Therefore, any system failure will be detected by two comparators, and it follows that the signal chain common to these two comparators is at fault. The logic implementation of the system does not interpret an alarm from a single comparator as a system failure but rather as a comparator failure. A single comparator failure will, however, cause the fault light light 432 on the center annunicator panel to light. If two comparators in the group 115(1A), 115(2A) and 115(3A) alarm, a system failure is indicated, but since the intermediate amplitude selective gates 55A, 55B and 55C will pass neither the highest nor the lowest signal, they will reject the signal from the failed signal chain, and the operation of the servo motors 65A, 65B and 65C will be unaffected. The logic, therefore, is implemented by the provision of the "OR" gates 300A and 300B, as heretofore described, so that one or two alarms from any of these comparators 115(1A), 115(2A), and 115(3A) only cause the fault light 432 to illuminate, but alarms from all three of the comparators 115(1A), 115(2A) and 115(3A) are required in order for the output of the "OR" gates 300A and 300B to change from a logic 1 to a logic 0 so as to deenergize the clutch control solenoids 110A and 110B to cause total system disengagement, since in the case of alarms from all the three comparators it is not possible to determine which, if any, of the signals are then correct.

The comparators have an inherent latching or memory feature so that once alarmed they will stay in that condition until reset by turning the system "OFF," then back "ON," by the operator manipulating the control member 655 so as to cause the switch element 651 to open the contact 652 and then back to close the contact 652 to reset the system.

The logic associated with comparators 115(1B), 115(2B) and 115(3B) is such that a single alarm will only light the fault light 432 again because a genuine malfunction will alarm two comparators. If comparators 115(1B) and 115(3B) alarm, servo loop No. 1 is at fault, whereupon the logic of "OR" gates 300C and 300E, as heretofore explained, will cause the control solenoid 110A to be deenergized and clutch 87A disengaged; likewise, if comparators 115(2B) and 115(3B) alarm, servo No. 2 is at fault, whereupon the logic of "OR" gates 300D and 300F, as heretofore explained, will cause the control solenoid 110B to be deenergized and clutch 87B disengaged.

If comparators 115(1B) and 115(2B) alarm, the servo model is the cause and nothing is disengaged. If comparators 115(1B), 115(2B) and 115(3B) all alarm, then, of course, the logic of the "OR" gates 300C, 300D, 300E and 300F is such as to effect deenergization of both clutch control solenoids 110A and 110B, whereupon both servo motors 65A and 65B are disengaged from the rudder control system 103 by the disengagement of both clutches 87A and 87B.

If the current in both the control solenoids 110A and 110B for the servo clutches is terminated by an automatic disconnect, manually turning the system off, or any other cause, the yaw damper inoperative lights 404 and 406 on the pilot's and copilot's instrument panel are illuminated. These lights will not be illuminated in the event of the deenergization of a single control solenoid 110A or 110B since this would not noticeably affect system performance.

Therefore, the system has the detection-elimination capabilities of precluding an unwanted sustained error signal from appearing at the aircraft control system. The system may be of a type such as described and claimed in a U.S. application Ser. No. 444,604, filed Apr. 1, 1965 by Albert T. Kirchhein and Louis J. Franchi and assigned to The Bendix Corporation.

TIMER

The timer 682 embodied in the aforenoted system has been shown in circuit detail in FIGURE 9. The timer 682 together with the resequencing control system therefor shown by FIGURES 4 and 8 provides the subject matter of the present invention claimed herein.

In the timer 682 there is connected across the input line 680 and ground a Zener diode 800 having a cathode element connected by a conductor 802 to the input line 680 and an anode element connected by a conductor 804 to a common ground. The Zener diode 800 is of a type having a reverse current breakdown characteristic effective upon the voltage applied at the input line 680 exceeding a predetermined critical value so as to bleed current from the input line 680 to the ground to regulate the current applied to the timer circuit to a predetermined voltage value.

Leading from the input line 680 is a resistor 802 having one end connected to the conductor 680 and an opposite end connected by a conductor 805 to a plate 806 of a timing capacitor 808 having an opposite plate 809 connected by a conductor 810 to one end of an inductor winding 812 and an opposite end connected to an output line 814 and arranged to suppress line transients.

The input line 680 leading through the switch 665 from the positive terminal of the battery or source of direct current 40 is connected at an opposite end to an anode element of a blocking diode 816 having a cathode element connected by a conductor 818 to series connected resistor 820, bases 822 and 824 of a unijunction transistor 825 and resistor 827 leading to the output line 814. The point 828 on the line 805 between the timing capacitor 808 and the resistor 802 is connected by a conductor 829 to an emitter element 831 of the unijunction transistor 825.

The bases 822 and 824 of the unijunction transistor 825 are biased by the battery 40 so as to normally maintain the path from the emitter 831 to the base 824 open in the absence of the capacitor 808 being charged to a value sufficient to render the unijunction transistor conductive from the emitter 831 to the base 824. Upon the capacitor 808 being charged through the resistor 802 by the battery 40 to the firing level of the unijunction transistor 825, the unijunction transistor 825 fires and becomes conductive. The time required for the capacitor 808 to be charged to the firing level of the unijunction transistor 825 is set by the resistor 802.

Upon the unijunction transistor 825 firing, the capacitor 808 then discharges through the emitter 831 and base 824 of the unijunction transistor 825 and the gating pulse is applied through a conductor 830 connecting the base 824 to a gating terminal 832 of a silicon controlled rectifier 833. The silicon controlled rectifier 833 has an anode element 835 connected through a conductor 707 to a positive terminal of a source of direct current 705 having a negative terminal thereof connected to ground through a conductor 709.

The silicon controlled rectifier further has a cathode element 843 connected through a conductor 845 to the output conductor 814 which is in turn connected to the output conductor 690 which, as shown in FIGURE 4, is connected to the anode element of a blocking diode 692 having a cathode element thereof connected through the switch element 696 to a load or relay winding 702 or filament 726 of the lamp 725 as the case may be and which are in turn connected to ground.

The silicon controlled rectifier 833 operates similar to a thyratron and passes current from the anode element 835 to the cathode element 843 upon a gating pulse being applied to the gating terminal 832. The gating pulse for the silicon controlled rectifier 833 is provided by the control action of the unijunction transistor 825 upon the capacitor 808 being charged to a voltage sufficient to fire the unijunction transistor at a predetermined time interval after the closing of the switch contact 667 by the switch element 665 operated by the test push button 663.

It will be seen then that initially the operation of the timer 682 is effected by the operator actuating the test push button 663 so as to cause the switch element 665 to close a switch contact 667, thereby directing a flow of current from the positive terminal of the battery 40 and through the conductor 680 so as to apply a positive charge on the plate 806 of the capacitor 808 through the resistor 802 and a negative charge on the plate 809 of the capacitor 808 through the conductor 810, inductor winding 812, conductor 814, conductor 690, diode 692, conductor 694, switch element 696, contact 698, and through the test relay winding 702 to ground.

The charging current applied through the winding 702 is insufficient to effectively energize the relay 702. However, upon the plate 806 of the capacitor 808 being charged to a sufficiently high positive value after a predetermined time interval, the positive charge applied to the plate 806 of the capacitor 808 and thereby through the conductor 829 to the emitter 831 of the unijunction transistor 825 rises to a value sufficient to fire the unijunction transistor 825. The unijunction transistor 825 thereupon fires and becomes conductive so that the capacitor 808 discharges through the emitter 831 and base 824 applying a gating pulse to the gating terminal 832 of the silicon controlled rectifier 833, whereupon an energizing current from the battery 705 is applied through the conductor 707 to the anode 835 of the silicon controlled rectifier 833 and from the cathode 843 thereof through conductor 845, conductor 690, diode 692, conductor 694, switch element 696, contact 698, conductor 700 and test relay winding 702, causing an effective energization of the test relay winding 702 and actuation of the electromagnetic core 733 so as to cause the relay switch elements 650(1A), 650(2A), 650(1B), 650(2B) and 715 to be actuated in opposition to the biasing force of the spring 716. Such actuation of relay switch elements causes the switch contact 746 to be opened and the switch contact 760 to be closed by the switch element 650(1A), the switch contact 750 to be opened and the switch contact 762 to be closed by the switch element 650(2A), the switch contact 752 to be opened and the switch contact 764 to be closed by the switch element 650(1B), the switch contact 754 to be opened and the switch contact 766 to be closed by the switch element 650(2B) and the switch contact 717 to be opened and the switch contact 730 to be closed by the switch element 715 thereby shorting out of operation one pair of the inputs to each of the respective comparators 115(1A), 115(2A), 115(3A), 115(1B), 115(2B) and 115(3B) and the test relay winding 702 to be locked in the energized condition by the closing of the contact 730 by the switch element 715.

The shorting out of operation of the one pair of the inputs of each of the several comparators will cause the comparators to apply a fault or logic 0 signal at the output 275 thereof and in turn cause the fault relay 448 to be energized through the logic circuitry of FIGURE 4 to actuate the electromagnetic core 699 and thereby the switch element 696 in opposition to the biasing force of the spring 697 so as to open the contact 698 and to close the contact 728, as shown in FIGURE 8. This mechanical action of the relay switch element 696 serves to momentarily interrupt the output circuit for the timer 682 which in turn terminates the flow of electrical energy through the silicon controlled rectifier 833 from the battery 705.

As heretofore explained, the interval of time between the opening of the switch contact 698 by the switch element 696 and the closing of the switch contact 728 is of a much greater duration (for example, 4 milliseconds) than that required for the termination of the flow of current through the silicon controlled rectifier 833 and resequencing of the action of the timer 682 which is effected over a much shorter time interval (for example, less than 100 microseconds). Thus, as a result of the opening of the contact 698 by the switch element 696 under the electromagnetic force of the fault relay winding 448, there is effected a resequencing of the timer 682.

Moreover, the energization of the fault relay winding 448 thereby switches the output of the timer 682 from the test relay winding 702 of FIGURE 8 to the check reset light 725. However, since the firing of the unijunction transistor 825 has effectively discharged the capacitor 808, a recharging action is thereupon effected to initiate the timed interval of phase 2 of the sequence operation shown graphically in FIGURE 12.

Thereafter, during the phase 2 operation of the system, there is applied a positive charge from the battery 40 through the switch element 665 which is held in a position closing the contact 667 by the energized holding coil 685. A flow of charging current is once again effected from the battery 40 through the conductor 680, resistor 802 and conductor 805 to apply a positive charge on the plate 806 of the capacitor 808, the opposite plate 809 thereof having a negative charge applied thereto through conductor 810, inductor winding 812, conductor 814, conductor 690, diode 692, conductor 694, switch element 696, contact 728 and filament 726 to the ground. The charging current applied through the filament 726 is insufficient to effectively energize the filament 726 or illuminate the lamp 725.

However, upon the plate 806 of the capacitor 808 after a time interval predetermined by the setting of timer 682 once again charging to a positive value sufficient to cause through the emitter 831 the firing of the unijunction transistor 825, the capacitor 808 once again discharges through the emitter 831 and base 824 and there is then applied a gating pulse to the gating terminal 832 of the silicon controlled rectifier 833. An energizing current is then applied from the battery 705 through the silicon controlled rectifier 833, conductor 845, conductor 690, diode 692, conductor 694, switch element 696, switch contact 728 and the filament 726 of the light 725. Such energizing current from the battery 705 is sufficient to effectively energize the filament 726 to illuminate the check reset light 725 to indicate to the operator the completion of phase 2 of the push-to-test sequence, as indicated graphically by FIGURE 12.

At the completion of phase 2 of the push-to-test sequence, it is necessary in order to reinitiate phase 1 of the test sequence that the operator first adjust the control member 655 to the "OFF" position, causing deenergization of the test relay winding 702 and the fault relay winding 448 and return of the relay switch elements to the positions shown in FIGURE 8 and thereafter once again adjust the control member 655 to the "ON" position, causing the switch element 650 to close the switch contact 652, whereupon the sequence of operation of the test phases 1 and 2 may be repeated.

YAW RATE WASHOUT AND FILTER UNITS

The yaw rate washout and filter units 43A, 43B and 43C may, for purposes of ready interchangeability, be of identical structure, a circuit diagram of which is shown in FIGURE 13, but the operative connections of each of these units in the system and in relation with the comparators 115(1A), 115(2A), 115(3A), 115(1B), 115(2B) and 115(3B) are different, as hereinafter explained. The units 43A, 43B and 43C, however, may be interchangeable subject to the proper connections being made thereto for the particular use to which they are to be adapted.

Subject to the foregoing, each of the units 43A, 43B and 43C includes input terminals 900 and 902 which are connected to the output conductors 22A, 22B or 22C, leading from the synchros 14A, 14B and 14C to the units 43A, 43B and 43C.

The input terminals 900 and 902 are connected to the input of an amplifier network which may be of a conventional type indicated generally by the numeral 905 and the output of the amplifier is connected to the input of a demodulator network 907 which may be also of conventional type and thereby to a washout and filter network 909 so designed and arranged as to provide the signal operating characteristics, as hereinafter explained.

The filter circuit 909 in turn provides an output applied through a modulator network 911 and thence to an emitter follower network 913 which is likewise of conventional type and thereby to output terminals 914 and 915 which are connected to output conductors 44 leading to the input of the intermediate amplitude selective gates 55A, 55B or 55C from the units 43A, 43B and 43C, as heretofore explained.

The demodulator network 907 and the modulator network 911 are provided with a suitable supply of alternating current operating power connected into the units 43A, 43B and 43C through a terminal 917 connected to the respective power lines 16A, 16B and 16C leading from the separate alternating current supplies 18A, 18B and 18C.

A detailed explanation of the circuitry of the amplifier 905, demodulator 907, filter 909, modulator 911 and emitter follower 913 has not been given as such circuitry is well known in the art and further explanation thereof is not deemed necessary.

It may be noted, however, that the signals applied at the input terminals 900–902 of the units 43A, 43B and 43C are derived from the output of the signal pick-off synchros 14A, 14B and 14C of the yaw rate gyroscopes 10A, 10B and 10C which sense a yawing motion of the aircraft and the washout and filter network 909 of the units 43A, 43B and 43C is so arranged as to take advantage of changes in frequency of the dutch roll characteristics in the aircraft to adjust the gain in the yaw damper signal effected through the units 43A, 43B and 43C (degrees of rudder commanded per degrees of yaw rate) as required.

This frequency has been found to be a function of the air speed of the craft. Thus, under high speed conditions of the aircraft, the frequency of the Dutch roll characteristics of the aircraft has been found to be greater than that of the frequency of the Dutch roll characteristics of the aircraft in the lower air speed conditions. A higher gain in the yaw damper signal applied through units 43A, 43B and 43C and at the output lines 44 is required when the Dutch roll frequency is relatively low (approximately 0.1 cycle per second) as under low air speed conditions, particularly at approach and take-off. Conversely, less gain in the yaw damper signal applied through the units 43A, 43B and 43C is required at the higher frequencies of Dutch roll (approximately 0.2 cycle per second) that are encountered in normal cruise or high speed flight.

The filter network 909 is so designed to effectively remove higher frequency signals (5 cycles per second and higher) which might cause undesirable coupling with body-bending modes of the aircraft. Such washout feature of the filter network 909 allows the system to synchronize to a constant yaw rate signal, as during a turning maneuver of the aircraft. This is accomplished by implementing the filter network 909 so that it has zero gain for steady state signals.

CONTROL RELAYS FOR FILTER UNITS

A feature of the yaw rate washout and filter units 43A, 43B and 43C is a provision of novel control relays 921, 922 and 923. The relay 921 is arranged to ground out of operation one aspect of the filter 909 and the comparators 115(1A), 115(2A) and 115(3B) when the operator-operative control member 655 is in the "OFF" position and to render such aspect of the filter 909 effective and the aforenoted comparators operative when the operator-operative control member 655 is in the "ON" position. Similarly, the relay 922 is arranged to ground out of operation the comparators 115(1B), 115(2B) and 115(3A) and the current monitors 337(1A) and 337(1B) when the operator-operative control member 655 is in the "OFF" position and to render the aforenoted comparators and the current monitors 337(1A) and 337(1B) operative when the operator-operative control member 655 is in the "ON" position. The relay 923 is arranged to ground out of operation other aspects of the filter 909 of the units 43A, 43B and 43C when the operator-operative control member 655 is in the "OFF" position and to render such aspects of the filter 909 effective when the operator-operative control member 655 is in the "ON" position.

In the aforenoted monitoring and testing system, it will be seen that the system has provision for only two separate 28-volt direct current supplies, namely, sources 40 and 356, and in view of this, a unique power arrangement for the control relays 921, 922 and 923 of the units 43A, 43B and 43C has been provided.

Thus, when the system is in the "OFF" mode, a switch element 650, as shown by FIGURE 8, is positioned so as to open the contact 652 and close a contact 651 connected through a conductor 930 to the terminal 932 of the yaw rate washout and filter 43A, while the switch element 653 is simultaneously positioned so as to open a switch contact 656 and close a switch contact 654 connected through a conductor 931 to the terminal 932 of the yaw washout and filter unit 43B. However, upon the operator-operative control 655 being positioned from the "OFF" mode to the "ON" mode, the switch element 653 opens the contact 654 and closes the contact 656 connected through a conductor 933 to the switch terminal 932 of the yaw rate washout and filter 43C, while simultaneously the switch element 650 opens the switch contact 651 and closes the switch contact 652.

The terminal 932 of the units 43A, 43B and 43C in each instance is connected, as shown by FIGURE 13, through conductors 934, 936 and 938 to a terminal of each of the relay windings 941, 942 and 943 of the respective relays 921, 922 and 923. The opposite terminals of the respective windings 941, 942 and 943 are connected to a grounded conductor 945 which is in turn connected to the common grounded terminal 902 of the units 43A, 43B and 43C.

Thus, upon the terminal 932 of the units 43A, 43B and 43C being connected to sources of electrical energy 40 or 356, as the case may be, by the action of the switch elements 650 and 653, the windings 941, 942 and 943 are energized to effect the desired control operation of the comparators and yaw washout filter units when the system is in the "OFF" and "ON" modes of operation.

Thus, when the system is in the "OFF" mode of operation, the windings 941, 942 and 943 of the control relays for the units 43A and 43B are energized to effect the desired shorting out of operation of the comparators and filter networks controlled thereby, while the windings 941, 942 and 943 of the control relays for the unit 43C are deenergized to effect the same shorting out of operation of the filter network 909 thereof and the respective comparators controlled thereby. Similarly, when the operator-operative control 655 is positioned from the "OFF" mode to the "ON" mode, the windings for the relays 921, 922 and 923 of the unit 43C are energized to render effective the filter network 909 thereof and the comparators controlled thereby operative, while the control windings for the relays 921, 922 and 923 of the units 43A and 43B are deenergized to render effective the filter network 909 thereof and the several comparators controlled thereby operative.

Thus, through this unique arrangement with the separate supplies 40 and 356 providing the energizing sources for the units 43A and 43B and the one supply 356 providing the energizing source of the unit 43C, the majority logic is not lost in the event of a single 28-volt direct current power loss of either source 40 or 356.

In effecting the foregoing operation, the relay 921 includes two spring switch arms 950 and 952 controlled by the electromagnetic winding 941. The spring switch arm 950 is connected through a conductor 953 to the grounded conductor 945 and is normally biased under the spring tension of the arm 950 into a position closing the switch contact 955 upon the relay winding 941 being deenergized, while upon energization of the relay winding 941, the spring switch arm 950 is biased out of closing relation with the contact 955 and into closing relation with a second switch contact 957.

The contact 955 is connected through a conductor 958 to a terminal 960 which, in the unit 43C, may be connected to the conductor 261(2A) leading from the comparator 115(2A) so that, upon deenergization of the relay winding 941 in the unit 43C as in the "OFF" position of the control member 655, the conductor 261(2A) from the comparator 115(2A) is connected to ground so as to short out of operation the comparator circuit, as shown in FIGURE 3. In the units 43A and 43B the terminal 960 is open and not used.

On the other hand, the switch contact 957 is connected by a conductor 963 to a terminal 964 which, in the unit 43A, may be connected to the conductor 261(1A) from the comparator 115(1A) and in the unit 43B, the terminal 964 may be connected to the conductor 261(3B) leading from the comparator 115(3B), as shown in FIGURES 2 and 2A. In the unit 43C the terminal 964 is open and not used.

Thus, in either the unit 43A or the unit 43B, upon the operator-operative control 655 being in the "OFF" position, the energization of the control winding 941 in the unit 43A or the unit 43B will be effective to actuate the arm 950 into the down position, closing the contact 957 so as to short out of operation the comparator circuit of the comparator 115(1A) and the comparator 115(3B) in the "OFF" position of the control member 655.

Furthermore, the spring switch arm 952 is connected by a conductor 970 to a point 972 in the filter circuit 909 connected to one plate of the capacitor 975. The spring switch arm 952 is normally biased under the spring tension thereof into contacting relation with a switch contact 977 connected through a conductor 978 with a terminal 980 which, in the filter unit 43C, is normally connected to ground. Thus, upon deenergization of the windings of the control relays in the unit 43C as in the "OFF" position of the control member 655, the filter capacitor 975 is appropriately connected to ground through the switch 952 so as to render the filter network 909 in the unit 43C inoperative in the "OFF" mode of operation. However, upon the operator-operative control 655 being adjusted to the "ON" position, the relay winding 941 of the unit 43C will be energized and the switch 952 actuated thereby out of contacting relation with the contact 977, whereupon the filter 909 of the unit 43C will be returned to an operative condition. In the units 43A and 43B the terminal 980 is open and not used.

Furthermore, the switch element 952, upon energization of the relay winding 941, is arranged to close a contact 985 connected by a conductor 987 to an output terminal 989 which, in the units 43A and 43B, is arranged to be connected to ground, whereby, upon adjustment of the operator-operative control 655 to the "OFF" mode effecting energization of the relay winding 941, the filter capacitor 975 of the units 43A and 43B may be appropriately connected to ground through the switch element 952 so as to render the filter network 909 in the units 43A and 43B inoperative in the "OFF" mode of operation. In the unit 43C the terminal 989 is open and not used.

The relay 922 includes spring switch arms 398 and 990 controlled by the electromagnetic winding 942. The switch arm 398 is connected by a conductor 992 to a terminal 993 which, in the units 43A and 43B, is connected to ground. The spring switch arm 398 is normally biased into contacting relation with an open contact 995. However, upon energization of the electromagnetic winding 942 in the units 43A and 43B as upon the operator-operative control 655 being adjusted to the "OFF" position, the switch arm 398 is biased by the electromagnetic winding 942 into closing relation with a switch contact 397 which is connected by a conductor 396 to a terminal 1000 which, in the units 43A and 43B, is connected to the conductor 396 leading to the current monitors 337A and 337B, respectively, as shown in FIGURES 4 and 6. Thus, upon the operator-operative control 655 being adjusted to the "OFF" position, the energization of the electromagnetic windings 942 in the units 43A and 43B is effective to short the respective current monitors 337A and 337B out of operation in the "OFF" mode and upon the operator-operative control member 655 being adjusted to the "ON" position, the spring switch arm 398 in the units 43A and 43B are biased under the spring tension thereof out of contacting relation with the switch contact 397 so as to render the respective current monitors 337A and 337B operative. In the unit 43C the terminals 993 and 1000 are open and not used.

The switch element 990 of the relay 922 is connected by a conductor 1002 to the grounded conductor 945 and is biased under the spring tension of the arm 990 into closing relation with the contact 1005 upon deenergization of the relay winding 942. The switch contact 1005 is connected through a conductor 1007 to a terminal 1009 which, in the unit 43C, is connected to the output conductor 261(3A) leading from the comparator 115(3A) so that, upon the operator-operative control member 655 being adjusted to the "OFF" position, the relay winding 942 in the unit 43C is effectively deenergized, whereupon the relay switch arm 990 under the spring biasing force thereof is effective to short out of operation the comparator 115(3A), while upon the operator-operative control 655 being adjusted to the "ON" position, effecting energization of the relay winding 942 in the unit 43C, the relay switch element 990 is biased out of contacting relation with the contact 1005 so as to render the comparator 115(3A) thereupon operative. In the units 43A and 43B the terminal 1009 is open and not used.

Further, in the units 43A and 43B the energization of the relay winding 942 upon the operator-operative control 655 being adjusted to the "OFF" position is effective to actuate the relay switch arm 990 into contacting relation with the switch contact 1007 connected through a conductor 1009 leading to an output terminal 1011 which, in the unit 43A, is connected to the output conductor 261(1B) leading from the comparator 115(1B) to short out of operation the comparator 115(1B) upon the operator-operative control 655 being adjusted to the "OFF" position.

In the unit 43B, the terminal 1011 is connected to conductor 261(2B) so that, in the unit 43B, the comparator 115(2B) is shorted out of operation upon the operator-operative control 655 being adjusted to the "OFF" position. However, upon the operator-operative control being adjusted to the "ON" position, the electromagnetic winding 942 is deenergized so as to open the contact 1007 and, in the unit 43A, the comparator 115(1B) is thereupon rendered operatively effective and, in the unit 43B, the comparator 115(2B) is likewise rendered effective by the switch arm 990 under the spring biasing force thereof being positioned out of contacting relation with the contact 1007. In the unit 43C the terminal 1011 is open and not used.

The relay 923 includes spring switch arms 1015 and 1017 controlled by the relay winding 943. The spring switch arm 1015 is connected by a conductor 1018 to a point 1020 connected to the opposite plate of the filter capacitor 975 from that to which the conductor 970 is connected. The spring arm 1015 is biased under the spring tension thereof into engaging relation with the contact 1020 upon the relay winding 943 being deenergized. The contact 1020 is connected by a conductor 1022 to a terminal 1024 which, in the unit 43C, is connected to ground.

Thus, upon the operator-operative control member 655 being adjusted to the "OFF" position, the resulting deenergization of the relay winding 943 permits the spring arm 1015 in cooperation with the action of the spring switch arm 952 to appropriately connect the opposite plates of the filter capacitor 975 to ground. However, upon the operator-operative control 655 being adjusted to the "ON" position, the resulting energization of the relay windings 941 and 943 actuates the respective switch arms 952 and 1015 out of contacting relation with the contacts 977 and 1020, respectively, so as to disconnect opposite plates of the filter capacitor 975 from the respective ground connections in the unit 43C so that the filter network 909 therein is returned to an operating condition. In the unit 43A and 43B the terminal 1024 is open and not used.

Further, the energization of the relay winding 943 in the units 43A and 43B is effective to bias the switch arm 1015 into contacting relation with a switch contact 1025 which is connected through a conductor 1027 to a terminal 1030 which, in the units 43A and 43B, is connected to ground.

Thus, in the units 43A and 43B, adjustment of the operator-operative control 655 to the "OFF" position is effective to energize the relay winding 943 to cause the switch arm 1015 to connect the point 1020 through the switch contact 1025 to ground and in cooperation with the action of the switch arm 952 of the units 43A and 43B in closing switch contact 985, the switch arms 952 and 1015 are then effective to appropriately connect the opposite plates of the filter capacitor 975 to render the filter network 909 ineffective in the units 43A and 43B.

However, upon the operator-operative control 655 being adjusted to the "ON" position, the resulting de-energization of the relay windings 941 and 943 in the units 43A and 43B is effective to return the filter network 909 in the units 43A and 43B to an operative condition by disconnecting the aforenoted ground connections of the filter capacitor 975. In the unit 43C the terminal 1030 is open and is not used.

The spring switch arm 1017 of the relay 923 is connected through a conductor 1035 to a third point 1037 in the filter network 909 and is operative to shunt those resistors in the filter network intermediate the points 972 and 1037 to ground to render the filter network 909 ineffective upon the operator-operative control 655 being in the "OFF" position.

Thus, in the unit 43C the relay winding 943 is de-energized upon the operator-operative control 655 being adjusted to the "OFF" position, whereupon the spring switch arm 1017 is effective to close a switch contact 1040 which is connected through a conductor 1042 to a terminal 1043. The terminal 1043 in the unit 43C is connected to ground so that the switch arm 1017 is thereupon effective to connect the point 1037 of the filter 909 to ground to render the filter network 909 of the unit 43C ineffective upon the operator-operative control 655 being in the "OFF" position.

However, upon the operator-operative control 655 being adjusted to the "ON" position at which the relay winding 943 of the unit 43C will be energized, the spring switch arm 1017 will be biased out of closing relation with the contact 1040, whereupon the point 1037 of the filter 909 will be disconnected from ground and the filter network in the unit 43C rendered normally operative. In the units 43A and 43B the terminal 1043 is open and not used.

However, in the units 43A and 43B upon the operator-operative control 655 being adjusted to the "OFF" position, the relay winding 943 in the units 43A and 43B will be energized, whereupon the spring switch arm 1017 will be biased into closing relation with a contact 1050 connected by a conductor 1055 to a terminal 1060 which, in the units 43A and 43B, is connected to ground.

Thus, in the units 43A and 43B, upon the electromagnetic winding 943 being energized as upon the control member 655 being adjusted to the "OFF" position, the spring switch arm 1017 is biased into closing relation with the contact 1050 so as to connect the point 1037 in the filter network 909 in the units 43A and 43B to ground to render the filter network inoperative in such off condition.

Moreover, upon the relay winding 943 in the units 43A and 43B being deenergized as upon the operator-operative control member 655 being adjusted to the "ON" position, the switch 1017 under the spring biasing force thereof opens the contact 1050, whereupon the point 1037 in the filter network 909 in the units 43A and 43B is disconnected from ground and the filter network 909 in the units 43A and 43B rendered normally operative during the "ON" condition of the operator-operative control member 655. In the unit 43C the terminal 1060 is open and not used.

From the foregoing, it will be seen that the relays 941, 942 and 943 in the units 43A, 43B and 43C serve to perform the following functions:

(1) Resequence the operation of the comparators 115(1A), 115(2A), 115(3A), 115(1B), 115(2B), and 115(3B) with the "OFF" and "ON" adjustment of the operator-operative control member 655.

(2) Resequence the operation of the filter network 909 in the units 43A, 43B and 43C with the operation of the "OFF" and "ON" control member 655.

(3) Further provide appropriate system engaged logic to the solid state switching by controlling the operative condition of the current monitor 337A and 337B, as shown in FIGURE 6, with the positioning of the operator-operative control 655 to an "ON" and "OFF" position thereof.

Thus, the comparators and filter units are resequenced by the positioning of the control member 655, of FIGURE 8, to the "OFF" position. In this position, the control relays 421, 422 and 423 are either energized or deenergized, depending upon the mode of operation thereof as applied to the unit 43A, 43B or 43C. In either case, appropriate connections to the control relays of the filter unit, as shown by FIGURE 13, are made thereto so as to translate the correct logic to the various terminals, as explained. Those terminals of the control network not used in the particular unit 43A, 43B or 43C are left open. The resultant effect then is that all of the comparators are supplied with a connection to ground when the system is off and all the filter capacitors of the filter network 909 in the units 43A, 43B and 43C are appropriately jumped to ground through the operation of the several relays 921, 922 and 923, as heretofore explained.

OPERATION

The automatic monitoring and testing system may be of a type such as described and claimed in the U.S. application Ser. No. 444,604, filed Apr. 1, 1965 by Albert T. Kirchhein and Louis J. Franchi and assigned to The Bendix Corporation.

This system and technique assures that prior to take-off the equipment is functioning properly and will give positive control over the aircraft; also, that in the event of a malfunction, the system will be able to detect this malfunction so proper corrective action may be taken. The system assures that the overall system is capable of maintaining proper flight attitude and that the logic is fully operational. This will give the operator of the aircraft assurance of the maximum probability of a complete, safe mission.

The system, as shown in FIGURES 1, 2 and 2A, includes three sensors 10A, 10B and 10C; three filter-amplifiers 43A, 43B and 43C; three intermediate amplitude selective gates 55A, 55B and 55C; two servo amplifiers 59A and 59B; two servo motors 65A and 65B; one servo simulator 59C–65C; comparators 115(1A), 115(2A), 115(3A), 115(1B), 115(2B) and 115(3B) and associated logic circuitry, as shown in FIGURE 4.

The comparators 115 include a control network which will detect a predetermined voltage difference and whose output is a logical 1 or 0, depending upon the difference of signal input. Once any comparator is alarmed, it is then locked in the alarm mode until manually reset. A typical comparator circuit that may be used is shown schematically in FIGURE 3.

Prior to take-off of the aircraft, a solenoid held push-to-test switch 663, shown in FIGURE 8, is pressed by the operator to apply an exciting voltage from the source 40 to the rate gyro torquing coils 34A, 34B and 34C which in turn impress a steady-state forcing function into the three yaw damper rate gyro inputs. Simultaneously, a timer 682 is started.

The forcing function causes the filter network 909 in the units 43A, 43B and 43C to emit a signal whose characteristics are such that it puts out a signal which raises to a predetermined peak level, then gradually decays back to null in a specified time, as shown graphically in FIGURE 12. The peak value of this signal is very much in excess of the trip levels of the comparators 115(1A), 115(2A) and 115(3A). The total closed-loop system responds to this forcing function by causing the servo motors 65A, 65B and 65C to displace as a function of the filter washout and thereby causing the synchros 96A, 96B and 96C to generate a large follow-up signal which is in turn monitored by comparators 115(1B), 115(2B) and 115(3B).

This portion of the test procedure monitors the tracking capabilities of the system. If all channel gains are within specified limits, the comparators will not go into the alarm mode. If for any reason there exists a failure either due to a passive nature, hardover nature or an excess in tolerance build-up, a comparator or comparators will go into the alarm mode and a fault indication will be presented to the pilot or individual performing the test by illumination of the fault light 432.

Furthermore, if a fault does occur during this portion of the test, the fault relay 448 will be also energized, causing the switch element 696 to open contact 698 and close contact 728 so that the second phase of the test procedure is not sequenced and the test is stopped, and so indicated by illumination of the reset light 725 under control of the timer 682. The timer 682 of FIGURE 9 and the resequencing control system of FIGURES 4 and 8, as heretofore explained, provides the subject matter of the present invention.

If no faults occur during the tracking portion of the test, the second phase (failure detection capabilities) is automatically programmed by the resequencing of the timer 682 by the energization of the test relay 702 as heretofore explained. Thus, if no faults have occurred during the tracking portion or first phase, then the test relay 702 is activated and self-latched as a function of the timing network started at the initiation of the test procedure. At this time the timing circuit 682 is automatically reset. Once energized, the test relay 702 removes the voltage from the rate gyro torquing coils 34A, 34B and 34C and simultaneously shorts to ground one-half of each of the six comparators 115(1A), 115(1B), 115(2A), 115(2B), 115(3A) and 115(3B). The filter networks 909 in the units 43A, 43B and 43C respond to the removal of the forcing function by generating a signal equal and opposite in polarity to that it generated in the tracking segment of the test.

Since one-half of each comparator is shorted to ground as the system responds to this negative step, a signal in excess of the alarm level is impressed on each comparator, forcing all six comparators into the alarm mode. At this point, logic information is generated to deenergize the clutch control solenoids 110A and 110B to disengage both servo clutches 87A and 87B and to illuminate the system off lights 404 and 406, fault light 432, monitor test light 622 and after a predetermined time interval the system reset light 725 determined by the setting of the timer 682. If all the channel comparators have functioned properly and no malfunctions have occurred in the logic, all the aforementioned lights will be illuminated at the conclusion of the test.

During the second phase of the test procedure, the entire logic circuitry is activated and also self-monitored. This is accomplished in the following manner:

The primary disconnect logic is generated by the comparators 115(1A), 115(1B), 115(2A), 115(2B), 115(3A) and 115(3B). This logic is simultaneously fed into the primary logic interrogation level of the "OR" gates 300A–300F, the fault indicator of "NAND" gates 440 and 442 and the composite monitor indicator or module failure indicator 450. The circuitry of the "OR" gates 300A–300F has the capability of interrogating, selecting and translating the appropriate disconnect logic to the system deactivation network including the clutch control solenoids 110A and 110B. All circuitry in the primary logic interrogation network is monitored by the module failure indicator 450. This circuit is itself monitored by having its output fed into the "NAND" gate 442 of the fault indicator 432 and the "NOR" gate 610 of the composite monitor 624. Any active failure of this circuit is detected by the fault indicator 432 and any passive failure is detected by the composite monitor test light 622. This technique of cross-monitoring of complementary levels of logic is used throughout the entire logic maze.

The system deactivation network of the clutch control solenoid 110A and 110B is monitored by the current monitors 337A and 337B of the system deactivation logic monitor including the yaw damper inoperative indicator lights 404 and 406. This network detects any active failure of the system deactivation logic circuit. All passive failures of the system deactivation logic are detected by the system engagement monitor 337A and 337B.

All circuitry, where applicable, is redundant to yield a fail-operative network. All excitations are from multiple-isolated supplies to preclude loss of logic as a result of a power loss.

Although only one embodiment of the invention has been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. In a fail operative apparatus for operating an aircraft control of a type including a pair of servo mechanisms, means operatively connecting the pair of servo mechanisms to the control so that under normal operation both servo mechanisms operate the control, said connecting means including selectively operable means for disconnecting said pair of servo mechanisms from the control, means for applying controlling signals to said pair of servo mechanisms, and means for terminating operation of said means for applying the controlling signals; the improvement comprising timing means, means operatively connected in an output of said timing means for rendering said terminating means effective after a predetermined delay period, and means responsive to operation of said terminating means for momentarily interrupting the output of said timing means to resequence the operation of said timing means.

2. In a fail operative apparatus for operating an aircraft control of a type including a pair of servo mechanisms, means operatively connecting the pair of servo mechanisms to the control so that under normal operation both servo mechanisms operate the control, said connecting means including selectively operable means for disconnecting said pair of servo mechanisms from the control, means for applying controlling signals to said pair of servo mechanisms, and means for terminating operation of said means for applying the controlling signals; the improvement comprising timing means, indicator means, switching means for selectively connecting said timing means in one sense to said terminating means for rendering said signal applying means inoperative after a predetermined delay period and in an alternate sense to said indicator means to render said indiactor means effective after a predetermined delay period to indicate the termination of the last mentioned delay period.

3. The comibnation defined by claim 2 including means responsive to an opeartive condition of said disconnecting means for rendering said switching means effective in said alternate sense to connect said timing means to said indicator means upon any one of said servo mechanisms being disconnected from the aircraft control by said selectively operable means.

4. In a fail operative apparatus for operating an aircraft control of a type including a first servo mechanism, a second servo mechanism, means operatively connecting the first and second servo mechanisms to the control so that under normal operation both servo mechanisms operate the control, a third servo mechanism operable as a monitoring device, means for applying controlling signals to said first, escond and third servo mechanisms, means for comparing opeartive conditions of said servo mechanisms, said connecting means including selectively operable means for disconnecting said first and second servo mechanisms from the control, and said disconnecting means being rendered effective by said comparing means to disconnect any one of said first and second servo mechanisms from the control upon the operative condition of said one servo mechanism differing from the compared operative condition of the others of said servo mechanisms by a value in excess of a predetermined differential value, and means for terminating operation of the means for applying the controlling signals; the improvement comprising timing means for rendering said terminating means effective after a predetermined delay period, other means operable upon said terminating means being rendered effective for resetting said comparing means so as to cause the compared operative conditions of each of said servo mechanisms to differ from the compared operative conditions of all of the other of said servo mechanisms by a value in excess of said predetermined differential value, said timing means including means operatively connected in an output of the timing means for resequencing operation of the timing means, and means responsive to output conditions of said comparing means effected by the resetting of the comparing means to render the resequencing means effetive.

5. The combination defined by cailm 4 in which said timing means includes a controlled rectifier operatively connected to a first source of electrical energy and having a gating terminal, a pulse forming circuit including a unijunction transistor connected to the gating terminal, a capacitor connected to the unijunction transistor and adapted to discharge through the unijunction transistor for providing a control pulse to the gating terminal of the controlled rectifier to render the controlled rectifier conductive upon the capacitor being charged to a predetermined value, a time delay circuit including the output of said timing means for applying an electrical current from a second source of electrical energy to said capacitor to charge the capacitor over a predetermined time interval, an output circuit including said first source of electrical energy, said controlled rectifier, and the means operatively connected in the output of the timing means, and said operatively connected means including means to momentarily interrupt the output of said timing means for an interval of time sufficient to render said controlled rectifier nonconductive to resequence operation of the controlled rectifier upon said time delay charging circuit being completed by termination of the interruption of the output of said timing means.

6. A timer for controlling energiaztion of a device from a first source of electrical energy, said timer comprising a controlled rectifier operatively connected between said first source and an output of said timer connected to said device, said controlled rectifier having a gating terminal, a unijunction transistor, a timing circuit including the output of said timer, a resistor and a capacitor connected to the unijunction transistor, said capacitor being adapted to discharge through the unijunction transistor for providing a control pulse to the gating terminal of the controlled rectifier to render the controlled rectifier conductive of electrical energy from said first source and through the output of said timer to actuate the controlled device in one sense upon said capacitor being charged through said timing circuit to a predetermined value, means for applying an electrical signal from another source of electrical energy through the timing circuit for charging said capacitor, and control means for opening and closing the output of said timer, the actuation of said controlled device in said one sense rendering said control means momentarily effective for opening the output of said timer so as to interrupt the conduction of electrical energy from said first source and through said controlled rectifier to said device for a time interval sufficient to render the controlled rectifier nonconductive of electrical energy and thereafter resequence the operation of the timer by closing the output of the timer to another device to render effective the timing circuit for recharging the capacitor.

7. The combination defined by claim 6 including means operable by said first mentioned device for causing said control means to open the output of said timer upon energization of said first device from said first source of electrical energy upon completion of a first timed interval.

8. The combination defined by claim 6 including means operable by said first mentioned device for causing said control means to open the output of said timer upon energization of said first device from said first source of electrical energy upon completion of a first timed interval, and means thereafter operable by said control means to render effective the other device selectively connected to the output of the timer by said control means and energized from said first source through said controlled rectifier and output of said timer upon completion of a second timed interval.

9. A timer for controlling energization of a device from a first source of electrical energy, said timer comprising a controlled rectifier operatively connected between said first source and an output of said time connected to said device, said controlled rectifier having a gating terminal, a unijunction transistor having a pair of bases and an emitter element, a first resistor element serially connected to one of said bases and a second resistor element serially connected to another of said bases, a timing circuit including a third resistor element, a capacitor and an inductor winding serially connected with the output of said timer and across the serially connected bases and first and second resistor elements, a conductor connecting the emitter element of the unijunction transistor into the timing circuit at a point between the third resistor element and said capacitor, another conductor connecting the gating terminal of the controlled rectifier to said other base of said unijunction transistor, said capacitor being adapted to discharge through the emitter element and the other base of the unijunction transistor so as to provide a control pulse to the gating terminal of the controlled rectifier to render the controlled rectifier conductive of electrical energy from said first source and through the output of said timer to the control device upon said capacitor being charged through said timing circuit to a predetermined voltage, means for applying an electrical signal from another source of electrical energy through the timing circuit for charging said capacitor to said predetermined voltage, relay switch means for opening and closing the output of said timer, said relay switch means momentarily opening the output of said timer so as to interrupt the conduction of electrical energy from said first source and through said controlled rectifier to said device for a time interval sufficient to render the controlled rectifier nonconductive of electrical energy, and said relay switch means being thereafter effective to resequence the operation of the timer upon the relay switch means closing the output of the timer to render effective the timing circuit for recharging the capacitor.

10. The combination defined by claim 9 including means operable by said device for causing said relay switch means to open the output of said timer upon energization of said device from said first source of electrical energy after a predetermined interval of time.

11. The combination defined by claim 9 including means operable by said device for causing said relay switch means to open the output of said timer upon energization of said device from said first source of electrical energy after a first predetermined interval of time, and contact means thereafter closed by said relay switch means to render effective another device selectively connected to the output of the timer by said relay switch means and energized from said first source through said controlled rectifier and output of said timer after a second predetermined interval of time.

References Cited

UNITED STATES PATENTS

| | | | |
|---|---|---|---|
| 2,803,814 | 8/1957 | Bloser | 340—234 |
| 3,146,392 | 8/1964 | Sylvan | 323—22 |
| 3,095,534 | 6/1963 | Cockrell | 321—19 |
| 3,166,691 | 1/1965 | McGee | 318—28 XR |
| 3,286,135 | 11/1966 | Haver et al. | 317—42 |
| 3,333,175 | 7/1967 | Klyce | 317—142 XR |

BENJAMIN DOBECK, *Primary Examiner.*

U.S. Cl. X.R.

317—142; 318—28